(12) United States Patent
Damnjanovic et al.

(10) Patent No.: US 11,800,412 B2
(45) Date of Patent: Oct. 24, 2023

(54) TECHNIQUES FOR CHANNEL MEASUREMENT REPORTING ACROSS DIFFERENT DISTRIBUTED UNITS (DUS) OF A BASE STATION (BS)

(71) Applicant: QUALCOMM Incorporated, San Diego, CA (US)

(72) Inventors: Jelena Damnjanovic, Del Mar, CA (US); Tao Luo, San Diego, CA (US); Junyi Li, Franklin Park, NJ (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 309 days.

(21) Appl. No.: 17/131,379

(22) Filed: Dec. 22, 2020

(65) Prior Publication Data

US 2022/0201560 A1    Jun. 23, 2022

(51) Int. Cl.
*H04W 36/00* (2009.01)
*H04W 36/04* (2009.01)
*H04W 48/20* (2009.01)

(52) U.S. Cl.
CPC .  *H04W 36/0058* (2018.08); *H04W 36/00837* (2018.08); *H04W 36/04* (2013.01); *H04W 48/20* (2013.01)

(58) Field of Classification Search
None
See application file for complete search history.

(56) References Cited

U.S. PATENT DOCUMENTS

| 10,644,974 B2 | 5/2020 | Novlan et al. |
| 2017/0273011 A1* | 9/2017 | Rico Alvarino ...... H04W 88/04 |
| 2019/0069333 A1 | 2/2019 | Kim |
| 2019/0387561 A1 | 12/2019 | Paladugu et al. |

FOREIGN PATENT DOCUMENTS

WO    WO-2019029689 A1    2/2019

OTHER PUBLICATIONS

Partial International Search Report—PCT/US2021/072249—ISA/EPO—dated Feb. 9, 2022 (2101019WO).
International Search Report and Written Opinion—PCT/US2021/072249—ISA/EPO—dated Apr. 28, 2022 (2101019WO).

* cited by examiner

*Primary Examiner* — Suhail Khan
(74) *Attorney, Agent, or Firm* — Arun Swain

(57) ABSTRACT

This disclosure provides systems, methods and apparatuses for a transmission, from a user equipment (UE) to a first distributed unit (DU), of one or more measurement reports including channel measurements of a set of cells associated with a second DU of a same central unit (CU) as the first DU. The UE may transmit the one or more measurement reports according to various reporting format options, including via separate reports for activated and deactivated cells of the second DU, a joint report for activated and deactivated cells of the second DU, or a joint report across a set of DUs including the first DU. The measurement reports may include one or more metrics associated with each cell of a configured cell set and the UE and the DUs of the same CU may activate or deactivate one or more cells for communication with the UE based on the measurement reports.

30 Claims, 13 Drawing Sheets

TECHNIQUES FOR CHANNEL MEASUREMENT REPORTING ACROSS DIFFERENT DISTRIBUTED UNITS (DUS) OF A BASE STATION (BS)

TECHNICAL FIELD

The following relates to wireless communications, including techniques for channel measurement reporting across different distributed units (DUs) of a base station.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communications at a user equipment (UE). The method may include receiving an indication of a configured cell set associated with a set of multiple distributed units (DUs) of a base station (BS), performing a channel measurement for each cell of the configured cell set as part of a mobility procedure, and transmitting, to a first DU of the set of multiple DUs, one or more measurement reports including channel measurement results for at least a subset of cells of the configured cell set.

Another innovative aspect of the subject matter described in this disclosure can be implemented in an apparatus for wireless communications at a UE. The apparatus may include a first interface, a second interface, and a processing system. The first interface may be configured to obtain an indication of a configured cell set associated with a set of multiple DUs of a BS. The processing system may be configured to perform a channel measurement for each cell of the configured cell set as part of a mobility procedure. The first interface or the second interface may be configured to output, to a first DU of the set of multiple DUs, one or more measurement reports including channel measurement results for at least a subset of cells of the configured cell set.

Another innovative aspect of the subject matter described in this disclosure can be implemented in another apparatus for wireless communications at a UE. The apparatus may include a processor, memory coupled with the processor, and instructions stored in the memory. The instructions may be executable by the processor to cause the apparatus to receive an indication of a configured cell set associated with a set of multiple DUs of a BS, perform a channel measurement for each cell of the configured cell set as part of a mobility procedure, and transmit, to a first DU of the set of multiple DUs, one or more measurement reports including channel measurement results for at least a subset of cells of the configured cell set.

Another innovative aspect of the subject matter described in this disclosure can be implemented in another apparatus for wireless communications at a UE. The apparatus may include means for receiving an indication of a configured cell set associated with a set of multiple DUs of a BS, means for performing a channel measurement for each cell of the configured cell set as part of a mobility procedure, and means for transmitting, to a first DU of the set of multiple DUs, one or more measurement reports including channel measurement results for at least a subset of cells of the configured cell set.

Another innovative aspect of the subject matter described in this disclosure can be implemented in a non-transitory computer-readable medium storing code for wireless communications at a UE. The code may include instructions executable by a processor to receive an indication of a configured cell set associated with a set of multiple DUs of a BS, perform a channel measurement for each cell of the configured cell set as part of a mobility procedure, and transmit, to a first DU of the set of multiple DUs, one or more measurement reports including channel measurement results for at least a subset of cells of the configured cell set.

One innovative aspect of the subject matter described in this disclosure can be implemented in a method for wireless communications at a UE. The method may include receiving an indication of a configured cell set associated with a set of multiple DUs of a BS, receiving, from the BS, a configuration of a common set of resources for an uplink channel measurement between the UE and each cell of the configured cell set, the common set of resources being used across the configured cell set that is associated with the set of multiple DUs of the BS, and transmitting, to each cell of the configured cell set, an uplink reference signal over the common set of resources for measurement at each DU of the set of multiple DUs.

Another innovative aspect of the subject matter described in this disclosure can be implemented in an apparatus for wireless communications at a UE. The apparatus may include a first interface, a second interface, and a processing system. The first interface may be configured to obtain an indication of a configured cell set associated with a set of multiple DUs of a BS. The first interface may be further configured to obtain, from the BS, a configuration of a common set of resources for an uplink channel measurement between the UE and each cell of the configured cell set, the common set of resources being used across the configured cell set that is associated with the set of multiple DUs of the BS. The first interface or the second interface may be configured to output, to each cell of the configured cell set, an uplink reference signal over the common set of resources for measurement at each DU of the set of multiple DUs.

Another innovative aspect of the subject matter described in this disclosure can be implemented in another apparatus for wireless communications at a UE. The apparatus may include a processor, memory coupled with the processor, and instructions stored in the memory. The instructions may be executable by the processor to cause the apparatus to receive an indication of a configured cell set associated with a set of multiple DUs of a BS, receive, from the BS, a configuration of a common set of resources for an uplink channel measurement between the UE and each cell of the configured cell set, the common set of resources being used across the configured cell set that is associated with the set of multiple DUs of the BS, and transmit, to each cell of the configured cell set, an uplink reference signal over the common set of resources for measurement at each DU of the set of multiple DUs.

Another innovative aspect of the subject matter described in this disclosure can be implemented in another apparatus for wireless communications at a UE. The apparatus may include means for receiving an indication of a configured cell set associated with a set of multiple DUs of a BS, means for receiving, from the BS, a configuration of a common set of resources for an uplink channel measurement between the UE and each cell of the configured cell set, the common set of resources being used across the configured cell set that is associated with the set of multiple DUs of the BS, and means for transmitting, to each cell of the configured cell set, an uplink reference signal over the common set of resources for measurement at each DU of the set of multiple DUs.

Another innovative aspect of the subject matter described in this disclosure can be implemented in a non-transitory computer-readable medium storing code for wireless communications at a UE. The code may include instructions executable by a processor to receive an indication of a configured cell set associated with a set of multiple DUs of a BS, receive, from the BS, a configuration of a common set of resources for an uplink channel measurement between the UE and each cell of the configured cell set, the common set of resources being used across the configured cell set that is associated with the set of multiple DUs of the BS, and transmit, to each cell of the configured cell set, an uplink reference signal over the common set of resources for measurement at each DU of the set of multiple DUs.

One innovative aspect of the subject matter described in this disclosure can be implemented in a method for wireless communications at a BS. The method may include transmitting, to a UE, an indication of a configured cell set associated with a set of multiple DUs of the BS, receiving, from the UE and at a first DU of the set of multiple DUs, one or more measurement reports including channel measurement results for at least a subset of cells of the configured cell set, and selecting one or more cells of the configured cell set for communication with the UE based on the channel measurement results for at least the subset of cells of the configured cell set.

Another innovative aspect of the subject matter described in this disclosure can be implemented in an apparatus for wireless communications at a BS. The apparatus may include a first interface, a second interface, and a processing system. The first interface may be configured to output, for transmission to a UE, an indication of a configured cell set associated with a set of multiple DUs of the BS. The first interface or the second interface may be configured to obtain, from the UE and at a first DU of the set of multiple DUs, one or more measurement reports including channel measurement results for at least a subset of cells of the configured cell set. The processing system may be configured to select one or more cells of the configured cell set for communication with the UE based on the channel measurement results for at least the subset of cells of the configured cell set.

Another innovative aspect of the subject matter described in this disclosure can be implemented in another apparatus for wireless communications at a BS. The apparatus may include a processor, memory coupled with the processor, and instructions stored in the memory. The instructions may be executable by the processor to cause the apparatus to transmit, to a UE, an indication of a configured cell set associated with a set of multiple DUs of the BS, receive, from the UE and at a first DU of the set of multiple DUs, one or more measurement reports including channel measurement results for at least a subset of cells of the configured cell set, and select one or more cells of the configured cell set for communication with the UE based on the channel measurement results for at least the subset of cells of the configured cell set.

Another innovative aspect of the subject matter described in this disclosure can be implemented in another apparatus for wireless communications at a BS. The apparatus may include means for transmitting, to a UE, an indication of a configured cell set associated with a set of multiple DUs of the BS, means for receiving, from the UE and at a first DU of the set of multiple DUs, one or more measurement reports including channel measurement results for at least a subset of cells of the configured cell set, and means for selecting one or more cells of the configured cell set for communication with the UE based on the channel measurement results for at least the subset of cells of the configured cell set.

Another innovative aspect of the subject matter described in this disclosure can be implemented in a non-transitory computer-readable medium storing code for wireless communications at a BS. The code may include instructions executable by a processor to transmit, to a UE, an indication of a configured cell set associated with a set of multiple DUs of the BS, receive, from the UE and at a first DU of the set of multiple DUs, one or more measurement reports including channel measurement results for at least a subset of cells of the configured cell set, and select one or more cells of the configured cell set for communication with the UE based on the channel measurement results for at least the subset of cells of the configured cell set.

One innovative aspect of the subject matter described in this disclosure can be implemented in a method for wireless communications at a BS. The method may include transmitting, to a UE, an indication of a configured cell set associated with a set of multiple DUs of the BS, transmitting, to the UE, a configuration of a common set of resources for an uplink channel measurement between the UE and each cell of the configured cell set, the common set of resources being used across the configured cell set that is associated with the set of multiple DUs of the BS, and receiving, via each cell of the configured cell set, an uplink reference signal over the common set of resources.

Another innovative aspect of the subject matter described in this disclosure can be implemented in an apparatus for wireless communications at a BS. The apparatus may include a first interface, a second interface, and a processing system. The first interface may be configured to output, for transmission to a UE, an indication of a configured cell set associated with a set of multiple DUs of the BS. The first interface may be configured to output, to the UE, a configuration of a common set of resources for an uplink channel measurement between the UE and each cell of the configured cell set, the common set of resources being used across the configured cell set that is associated with the set of multiple DUs of the BS. The first interface or the second interface may be configured to obtain, via each cell of the configured cell set, an uplink reference signal over the common set of resources.

Another innovative aspect of the subject matter described in this disclosure can be implemented in another apparatus for wireless communications at a BS. The apparatus may include a processor, memory coupled with the processor, and instructions stored in the memory. The instructions may be executable by the processor to cause the apparatus to transmit, to a UE, an indication of a configured cell set associated with a set of multiple DUs of the BS, transmit, to the UE, a configuration of a common set of resources for an uplink channel measurement between the UE and each cell of the configured cell set, the common set of resources being used across the configured cell set that is associated with the set of multiple DUs of the BS, and receive, via each cell of the configured cell set, an uplink reference signal over the common set of resources.

Another innovative aspect of the subject matter described in this disclosure can be implemented in another apparatus for wireless communications at a BS. The apparatus may include means for transmitting, to a UE, an indication of a configured cell set associated with a set of multiple DUs of the BS, means for transmitting, to the UE, a configuration of a common set of resources for an uplink channel measurement between the UE and each cell of the configured cell set, the common set of resources being used across the configured cell set that is associated with the set of multiple DUs of the BS, and means for receiving, via each cell of the configured cell set, an uplink reference signal over the common set of resources.

Another innovative aspect of the subject matter described in this disclosure can be implemented in a non-transitory computer-readable medium storing code for wireless communications at a BS. The code may include instructions executable by a processor to transmit, to a UE, an indication of a configured cell set associated with a set of multiple DUs of the BS, transmit, to the UE, a configuration of a common set of resources for an uplink channel measurement between the UE and each cell of the configured cell set, the common set of resources being used across the configured cell set that is associated with the set of multiple DUs of the BS, and receive, via each cell of the configured cell set, an uplink reference signal over the common set of resources.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
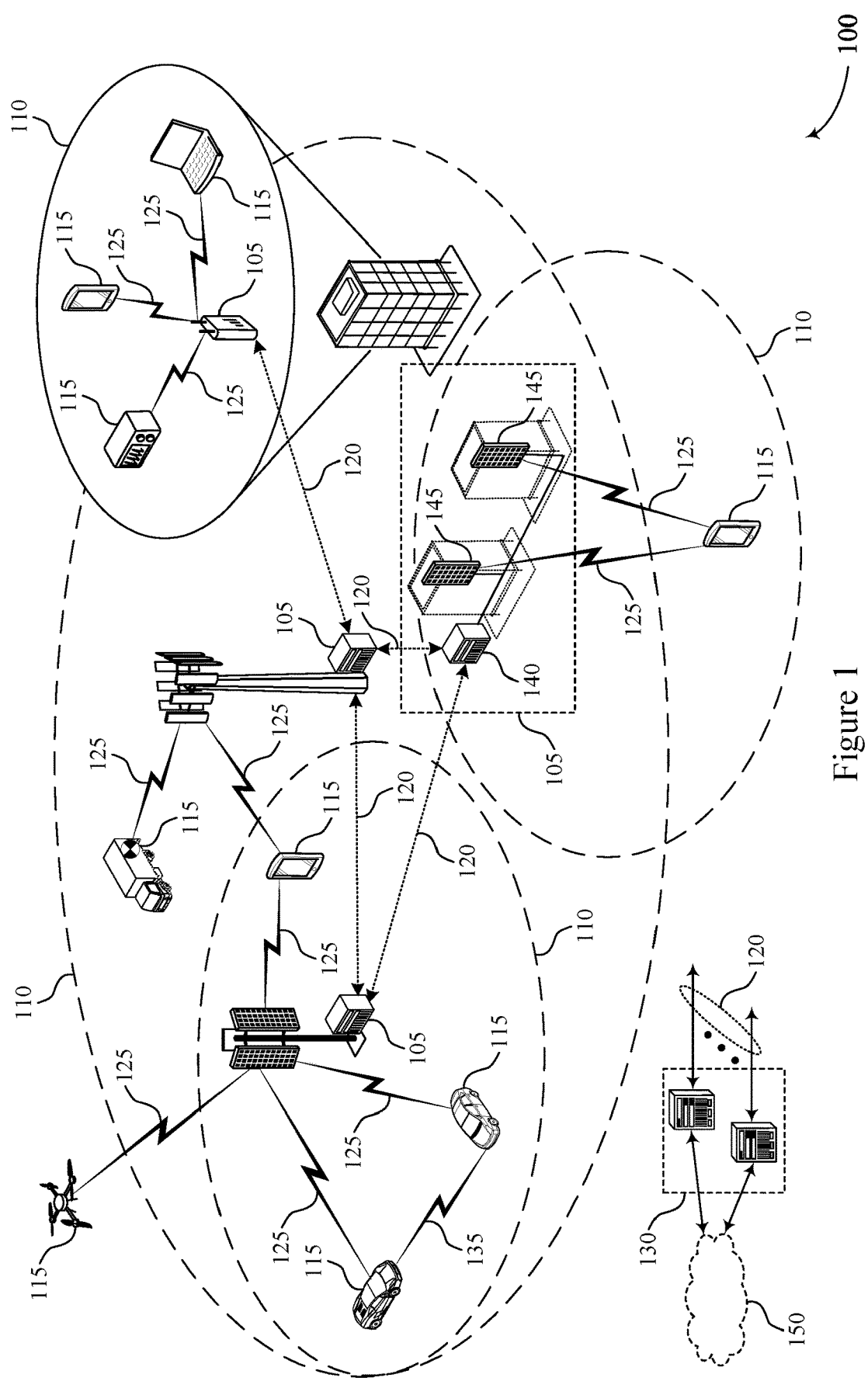
FIG. 1 illustrates an example of a wireless communications system that supports techniques for channel measurement reporting across different distributed units (DUs) of a base station (BS).

The following description is directed to some implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

In some wireless communications systems, a user equipment (UE) may establish a communication link with a base station via multiple cells of a configured cell set supported by the base station (BS). For example, within a larger configured cell set, the UE may communicate with the BS via an activated cell set and may refrain from communicating with the BS via a deactivated cell set. In some examples, such a configured cell set may be configured for layer one (L1) or layer two (L2) mobility, such that the UE or the BS may activate or deactivate cells of the configured cell set via L1 or L2 (L1/L2) signaling. Further, in some examples, the BS may operate a central unit (CU) that controls multiple distributed units (DUs), and each DU may control one or more cells of the configured cell set. As part of a mobility procedure involving cells of the configured cell set (such as maintenance of the activated cell set), the UE may measure a channel quality between the UE and each cell of the configured cell set and may transmit one or more measurement reports to a DU of the BS based on the measurements. In some aspects, a measurement report may include channel measurements for one or more cells controlled by the DU such that the UE may transmit the measurement report to the DU controlling the one or more cells (and not to other DUs). This may result in a lack of shared knowledge of channel conditions between cells controlled by different DUs, which may cause sub-optimal cell activation or deactivation.

In some implementations, the UE may transmit measurement reports for an L1/L2 mobility procedure to DUs different than a DU associated with cells included in the measurement report. For example, a UE may measure a channel between the UE and each of a second set of cells associated with (or controlled by) a second DU and may transmit one or more measurement reports including the channel measurements for the second set of cells to a first DU different than the second DU (and controlled by a same CU). As such, the first DU may have more complete channel knowledge for each cell measured by the UE regardless of which DU controls the measured cells. For example, the UE may additionally transmit one or more measurement reports to the first DU including channel measurements for a first set of cells controlled by the first DU such that the first DU may have channel knowledge of the first set of cells and the second set of cells. Accordingly, the first DU may coordinate with the second DU or may perform unilateral decisions on which cells of the first set of cells or the second set of cells may be activated or deactivated for communication with the UE.

The UE may transmit the one or more measurement reports to the first DU according to various reporting approaches. In some examples, for instance, the UE may transmit the measurement reports to the first DU for each (or all) cells of the configured cell set that are controlled by the multiple DUs of the BS. In some other examples, the UE may provide measurement reports to each DU of the multiple DUs and the multiple DUs may relay or otherwise share the measurement reports between the multiple DUs. Additionally, the UE may transmit the measurement reports to one or more DUs according to various reporting format options. In some implementations, for example, the UE may transmit, to the first DU, a first measurement report including channel measurements for cells of the second set of cells that are in the activated cell set and a second measurement report including channel measurements for cells of the second set of cells that are in the deactivated cell set. In some other implementations, the UE may transmit, to the first DU, a joint measurement report including channel measurements for all cells in the second set of cells (regardless of whether the cells are included in the activated cell set or the deactivated cell set). In some other implementations, the UE may transmit, to the first DU, a first measurement report including channel measurements for cells controlled by a set of multiple DUs including the second DU that are in the activated cell set and a second measurement report including channel measurements for cells controlled by the set of multiple DUs that are in the deactivated cell set.

Particular aspects of the subject matter described in this disclosure can be implemented to realize one or more of the following potential advantages. The described techniques may be implemented to support greater knowledge or coordination between DUs on which cells may be activated for communication with the UE. For example, based on providing channel measurements of cells controlled by the second DU to the first DU, the first DU may more optimally select which cells to activate for communication with the UE based on having more complete knowledge of the channels between the UE and the reported cells. Further, based on a more optimal selection of which cells are activated for communication with the UE, the UE may experience a greater likelihood for successful communication with one or more serving cells as the likelihood that the cells with the greatest channel quality are activated increases. Accordingly, the UE and the one or more connected cells may experience greater connectivity, higher data rates, increased throughput, and greater spectral efficiency, among other benefits.

FIG. 1 illustrates an example of a wireless communications system 100 that supports techniques for channel measurement reporting across different DUs of a BS. The wireless communications system 100 may include one or more BSs 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (for example, mission critical) communications, low latency communications, communications with low-cost and low-complexity devices, or any combination thereof.

The BSs 105 may be dispersed throughout a geographic area to form the wireless communications system 100 and may be devices in different forms or having different capabilities. The BSs 105 and the UEs 115 may wirelessly communicate via one or more communication links 125. Each BS 105 may provide a geographic coverage area 110 over which the UEs 115 and the BS 105 may establish one or more communication links 125. The geographic coverage area 110 may be an example of a geographic area over which a BS 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the BSs 105, or network equipment (for example, core network nodes, relay devices, integrated access and backhaul (IAB) nodes, or other network equipment), as shown in FIG. 1.

The BSs 105 may communicate with the core network 130, or with one another, or both. For example, the BSs 105 may interface with the core network 130 through one or more backhaul links 120 (for example, via an S1, N2, N3, or another interface). The BSs 105 may communicate with one another over the backhaul links 120 (for example, via an X2, Xn, or another interface) either directly (for example, directly between BSs 105), or indirectly (for example, via core network 130), or both. In some examples, the backhaul links 120 may be or include one or more wireless links.

One or more of the BSs 105 described herein may include or may be referred to by a person having ordinary skill in the art as a base transceiver station, a radio BS, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, and the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the BSs 105 and the network equipment including macro eNBs or gNBs, small cell eNBs or gNBs, or relay BSs, among other examples, as shown in FIG. 1.

The UEs 115 and the BSs 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (for example, in a carrier aggregation configuration), a carrier also may have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode in which initial acquisition and connection may be conducted by the UEs 115 via the carrier, or the carrier may be operated in a non-standalone mode in which a connection is anchored using a different carrier (for example, of the same or a different radio access technology).

The communication links 125 shown in the wireless communications system 100 may include uplink transmissions from a UE 115 to a BS 105, or downlink transmissions from a BS 105 to a UE 115. Carriers may carry downlink or uplink communications (for example, in an FDD mode) or may be configured to carry downlink and uplink communications (for example, in a TDD mode).

A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a radio access technology (for example, 1.4, 3, 5, 10, 15, 20, 40, or 80 megahertz (MHz)). Devices of the wireless communications system 100 (for example, the BSs 105, the UEs 115, or both) may have hardware configurations that support communications over a carrier bandwidth or may be configurable to support communications over one of a set of carrier bandwidths. In some examples, the wireless communications system 100 may include BSs 105 or UEs 115 that support simultaneous communications via carriers associated with multiple carrier bandwidths. In some examples, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (for example, a duration of one modulation symbol) and one subcarrier, and the symbol period and subcarrier spacing are inversely related. The number of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported. A numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the BSs 105 or the UEs 115 may be expressed in multiples of a basic time unit which may, for example, refer to a sampling period of $T_s=1/(\Delta f_{max} \cdot N_f)$ seconds, in which $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol periods in a TTI) may be variable. Additionally, or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each BS 105 may provide communication coverage via one or more cells, for example a macro cell, a small cell, a hot spot, or other types of cells, or any combination thereof. The term "cell" may refer to a logical communication entity used for communication with a BS 105 (for example, over a carrier) and may be associated with an identifier for distinguishing neighboring cells (for example, a physical cell identifier (PCID), a virtual cell identifier (VCID), or others). In some examples, a cell also may refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the BS 105. For example, a cell may be or include a building, a subset of a building, or exterior spaces between or overlapping with geographic coverage areas 110, among other examples.

A macro cell generally covers a relatively large geographic area (for example, several kilometers in radius) and may allow unrestricted access by the UEs 115 with service subscriptions with the network provider supporting the macro cell. A small cell may be associated with a lower-powered BS 105, as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A BS 105 may support one or multiple cells and also may support communications over the one or more cells using one or multiple component carriers.

In some examples, a carrier may support multiple cells, and different cells may be configured according to different protocol types (for example, MTC, narrowband IoT (NB-IoT), enhanced mobile broadband (eMBB)) that may provide access for different types of devices.

In some examples, a BS 105 may be movable and therefore provide communication coverage for a moving geographic coverage area 110. In some examples, different geographic coverage areas 110 associated with different technologies may overlap, but the different geographic coverage areas 110 may be supported by the same BS 105. In some other examples, the overlapping geographic coverage areas 110 associated with different technologies may be supported by different BSs 105. The wireless communications system 100 may include, for example, a heterogeneous network in which different types of the BSs 105 provide coverage for various geographic coverage areas 110 using the same or different radio access technologies.

The wireless communications system 100 may support synchronous or asynchronous operation. For synchronous operation, the BSs 105 may have similar frame timings, and transmissions from different BSs 105 may be approximately aligned in time. For asynchronous operation, the BSs 105 may have different frame timings, and transmissions from different BSs 105 may, in some examples, not be aligned in time. The techniques described herein may be used for either synchronous or asynchronous operations.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a BS 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 also may be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a BS 105. Other UEs 115 in such a group may be outside the geographic coverage area 110 of a BS 105 or be otherwise unable to receive transmissions from a BS 105. In some examples, groups of the UEs 115 communicating via D2D communications may utilize a one-to-many system in which each UE 115 transmits to every other UE 115 in the group. In some examples, a BS 105 facilitates the scheduling of resources for D2D communications. In some other examples, D2D communications are carried out between the UEs 115 without the involvement of a BS 105.

In some systems, the D2D communication link 135 may be an example of a communication channel, such as a sidelink communication channel, between vehicles (for example, UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (for example, BSs 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the BSs 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a BS 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or BS 105 may be distributed across various network devices (for example, radio heads and ANCs) or consolidated into a single network device (for example, a BS 105).

The wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 also may operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some examples, the wireless communications system 100 may support millimeter wave (mmW) communications between the UEs 115 and the BSs 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the BSs 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A BS 105 or a UE 115 may be equipped with multiple antennas, which may be used to employ techniques such as transmit diversity, receive diversity, multiple-input multiple-output (MIMO) communications, or beamforming. The antennas of a BS 105 or a UE 115 may be located within one or more antenna arrays or antenna panels, which may support MIMO operations or transmit or receive beamforming. For example, one or more BS antennas or antenna arrays may be co-located at an antenna assembly, such as an antenna tower. In some examples, antennas or antenna arrays associated with a BS 105 may be located in diverse geographic locations. A BS 105 may have an antenna array with a number of rows and columns of antenna ports that the BS 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The BSs 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), in which multiple spatial layers are transmitted to the same receiving device, and multiple-user MIMO (MU-MIMO), in which multiple spatial layers are transmitted to multiple devices.

Beamforming, which also may be referred to as spatial filtering, directional transmission, or directional reception, is a signal processing technique that may be used at a transmitting device or a receiving device (for example, a BS 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (for example, with respect to the antenna array of the transmitting device or receiving device, or with respect to some other orientation).

A BS 105 or a UE 115 may use beam sweeping techniques as part of beam forming operations. For example, a BS 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a BS 105 multiple times in different directions. For example, the BS 105 may transmit a signal according to different beamforming weight sets associated with different directions of transmission. Transmissions in different beam directions may be used to identify (for example, by a transmitting device, such as a BS 105, or by a receiving device, such as a UE 115) a beam direction for later transmission or reception by the BS 105.

Some signals, such as data signals associated with a receiving device, may be transmitted by a BS 105 in a single beam direction (for example, a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the BS 105 in different directions and may report to the BS 105 an indication of the signal that the UE 115 received with a highest signal quality or an otherwise acceptable signal quality.

In some examples, transmissions by a device (for example, by a BS 105 or a UE 115) may be performed using multiple beam directions, and the device may use a combination of digital precoding or radio frequency beamforming to generate a combined beam for transmission (for example, from a BS 105 to a UE 115). The UE 115 may report feedback that indicates precoding weights for one or more beam directions, and the feedback may correspond to a configured number of beams across a system bandwidth or one or more sub-bands. The BS 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a BS 105, a UE 115 may employ similar techniques for transmitting signals multiple times in different directions (for example, for identifying a beam direction for subsequent transmission or reception by the UE 115) or for transmitting a signal in a single direction (for example, for transmitting data to a receiving device).

A receiving device (for example, a UE 115) may try multiple receive configurations (for example, directional listening) when receiving various signals from the BS 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, when receiving a data signal). The single receive configuration may be aligned in a beam direction determined based on listening according to different receive configuration directions (for example, a beam direction determined to have a highest signal strength, highest signal-to-noise ratio (SNR), or otherwise acceptable signal quality based on listening according to multiple beam directions).

The UEs 115 and the BSs 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback, such that the device may provide HARQ feedback in a specific slot for data received in a previous symbol in the slot. In some other examples, the device may provide HARQ feedback in a subsequent slot, or according to some other time interval.

The wireless communications system 100 may include a packet-based network that operates according to a layered protocol stack. The layered protocol stack may include an RRC layer, a Packet Data Convergence Protocol (PDCP) layer, a Radio Link Control (RLC) layer, a Medium Access Control (MAC) layer, and a physical (PHY) layer. Layer 3 (L3) of the protocol stack may include the RRC layer, Layer 2 (L2) may include the PDCP layer, the RLC layer, and the MAC layer, and Layer 1 (L1) may include the PHY layer. In the user plane, communications at the bearer or PDCP layer may be IP-based. The RLC layer may perform packet segmentation and reassembly to communicate over logical channels. The MAC layer may perform priority handling and multiplexing of logical channels into transport channels. The MAC layer also may use error detection techniques, error correction techniques, or both to support retransmissions at the MAC layer to improve link efficiency. In the control plane, the RRC protocol layer may provide establishment, configuration, and maintenance of an RRC connection between a UE 115 and a BS 105 or a core network 130 supporting radio bearers for user plane data. At the physical layer, transport channels may be mapped to physical channels.

In the wireless communications system 100, the protocol stack layers described herein may be split into different units. For example, a BS 105 may include one or more CUs, DUs, radio units (RUs), or a combination thereof, and each CU, DU, or RU may include one or more of the protocol stack layers described herein. Additional details relating to such different units of the BS 105 are described herein, including with reference to FIGS. 2 and 4. In some aspects, the BS 105 may include a CU that controls multiple DUs, and each DU of the multiple DUs may control one or more cells with which a UE 115 may communicate.

In some examples, the UE 115 may establish a connection with one or more cells that are activated for communication with the UE 115 and, if channel conditions change (due to the UE 115 moving farther away from a cell, signal obstruction, or environmental factors), the UE 115 may perform a handover to a different cell (that provides better coverage to the UE 115). As such, the BS 105 may transmit L3 signaling, such as RRC signaling, to the UE to trigger the handover. The use of L3 signaling to facilitate handovers across cells may be referred to as L3 mobility. Because L3 mobility involves RRC signaling, L3 mobility may cause considerable delays in processing and signaling. As a result, the latency associated with performing a handover using L3 mobility may be relatively high, which may be detrimental to communications in the wireless communications system 100 (especially in examples in which the UE 115 performs frequent handovers, such as in examples in which the UE 115 communicates with the BS over FR2, but also FR1, radio frequency spectrum bands). As such, in some examples, the UE 115 and the BS 105 may exchange L1 or L2 signaling to reduce the latency associated with performing a handover. For example, the UE 115 or the BS 105 may exchange L1/L2 signaling to maintain an activated cell set for the UE 115. Such maintenance of the activated cell set may be in the context of or otherwise support mobility procedures via L1/L2 signaling, which may result in overall better performance and smaller cell loss as compared to mobility procedures led by L3 signaling.

In such examples in which the UE 115 and the BS 105 perform mobility procedures via L1/L2 signaling, the BS 105 may support a cell set that is configured for L1/L2 mobility and such a cell set may be referred to as an L1/L2 configured cell set. The L1/L2 configured cell set may include cells controlled by various different DUs of the BS 105 (which may be controlled by a common CU of the BS 105) and may include one or more subsets of cells. Such subsets of cells of the L1/L2 configured cell set may include an L1/L2 activated cell set including cells with which the UE 115 may communicate, an L1/L2 deactivated cell set including cells with which the UE 115 may refrain from communicating, or an L1/L2 candidate cell set including cells that the UE 115 may autonomously add to the L1/L2 activated cell set. Additional details relating to such cell sets are described herein, including with reference to FIG. 5.

In some examples of L1/L2 mobility, the UE 115 may measure a quality of a channel between the UE 115 and each cell of the L1/L2 configured cell set and may transmit one or more measurement reports to the different DUs such that each DU receives channel measurement results for cells controlled by that DU. For example, a first DU of the BS 105 may control a first set of cells of the L1/L2 configured cell set and a second DU of the BS 105 may control a second set of cells of the L1/L2 configured cell set and the UE 115 may transmit channel measurements for the first set of cells to the first DU and may transmit channel measurements for the second set of cells to the second DU. As such, a DU may have channel knowledge of cells that the DU controls, but may not have channel knowledge of cells controlled by other DUs. This may result in a lack of shared knowledge of channel conditions between the different DUs of the BS 105, which may cause sub-optimal activation or deactivation of cells within the L1/L2 configured cell set.

Further, in some examples, the UE 115 may have an upper limit on how many cells may be included within the L1/L2 activated cell set (for example, the UE 115 may be configured with an upper limit of cells with which the UE may communicate). As such, a lack of coordination between DUs may result in sub-optimal decisions on which cells are activated for communication with the UE 115, as some cells may be inaccurately excluded from the L1/L2 activated cell set. For example, the first DU of the BS 105 may control three cells that are included in the L1/L2 activated cell set and the second DU of the BS 105 may control five cells that are not in the L1/L2 activated cell set but that are associated with greater channel metrics than any of the three cells controlled by the first DU. In some examples, however, the first DU may be unaware of the greater channel metrics associated with the five cells controlled by the second DU and, as such, may refrain from deactivating any of the three cells controlled by the first DU. Accordingly, if the UE 115 is at the upper limit of cells that can be included in the L1/L2 activated cell set, the second DU may be unable to add any of the five cells controlled by the second DU to the L1/L2 activated cell set (because the first DU refrains from deactivating any of the three cells controlled by the first DU, which would otherwise have made room for any of the five cells controlled by the second DU).

In some implementations, the UE 115 may transmit one or more measurement reports to DUs different than a DU controlling the cells included in the measurement report. For example, the UE 115 may measure a channel between the UE 115 and each of a set of cells associated with (or controlled by) the second DU and may transmit one or more measurement reports including the channel measurements for the set of cells to the first DU. As such, the first DU may have knowledge of the channel conditions of the cells controlled by the second DU as well as the channel conditions of the cells controlled by the first DU. Accordingly, the first DU may more optimally select and signal (via L1/L2 signaling) which cells to activate or deactivate (for example, which cells to include in the L1/L2 activated cell set or in the L1/L2 deactivated cell set) based on channel conditions of cells across various DUs different than (but controlled by the same CU as) the first DU. For instance, in scenarios in which the first DU controls the three cells associated with lesser channel metrics than the five cells controlled by the second DU, the first DU may recognize or otherwise determine that the second DU controls the five cells of higher channel quality than the three cells of the first DU and may accordingly deactivate one or more of the three cells controlled by the first DU to provide an opportunity for the second DU to activate one or more of the five cells controlled by the second DU. Additional details relating to such diverse reporting of channel measurement results set to various DUs for maintenance of the L1/L2 activated cell set are described herein, including with reference to FIGS. 5-7.

Figure 2:
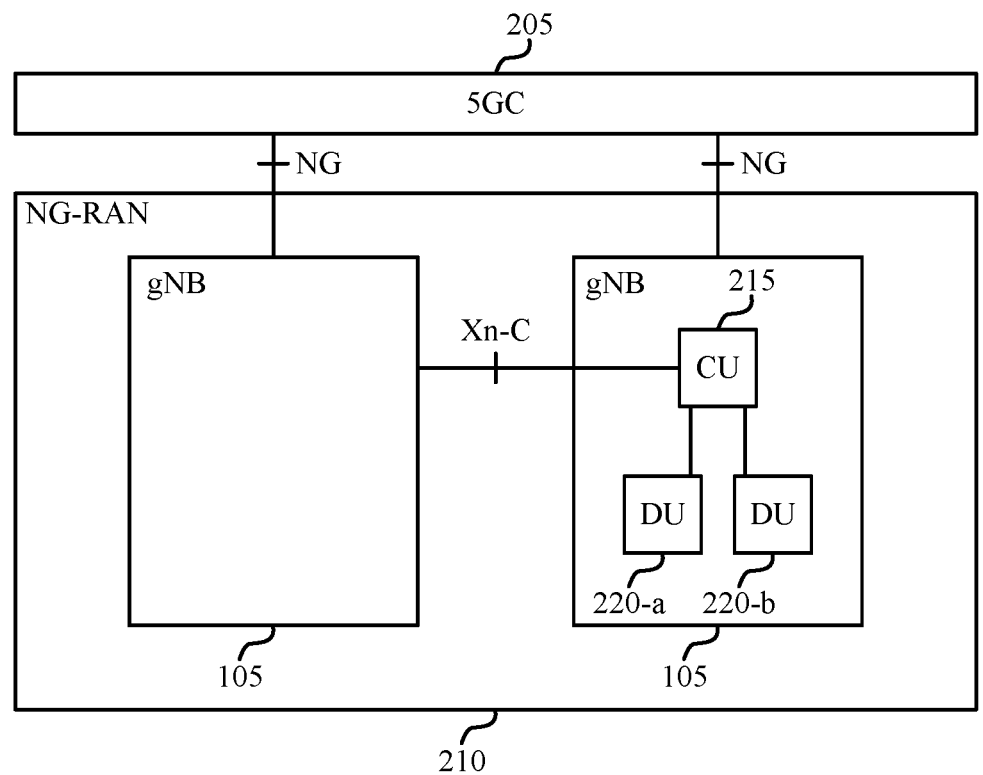
FIG. 2 illustrates an example of a network architecture that supports techniques for channel measurement reporting across different DUs of a BS.

FIG. 2 illustrates an example of a network architecture 200 that supports techniques for channel measurement reporting across different DUs of a BS. As illustrated in the network architecture 200, a core network 205, which may be an example of or otherwise function as a 5GC, may communicate with a radio access network (RAN) 210, which may be an example of or otherwise function as a next-generation (NG) RAN (NG-RAN), over an NG interface. The RAN 210 may include BSs 105 that may communicate with each other over an Xn-C interface. Each BS 105 may include a CU 215 and multiple DUs 220, such as a DU 220-*a* and a DU 220-*b*. The CU 215 may be a logical node hosting RRC, Service Data Adaptation Protocol (SDAP), and PDCP protocols of the BS 105. The CU 215 at the BS 105 also may control the operation of one or more DUs 220 at the BS 105 and may terminate an F1 interface connected with each DU 220 of the one or more DUs 220. The DU 220 may be a logical node hosting RLC, MAC, and PHY layers of the BS 105, and the operation of the DU 220 may be controlled by the CU 215. Each DU 220 may control or otherwise support one or multiple cells such that each cell is supported by a single DU 220. The DU 220 also terminates an F1 interface connected with the CU 215.

Figure 3:
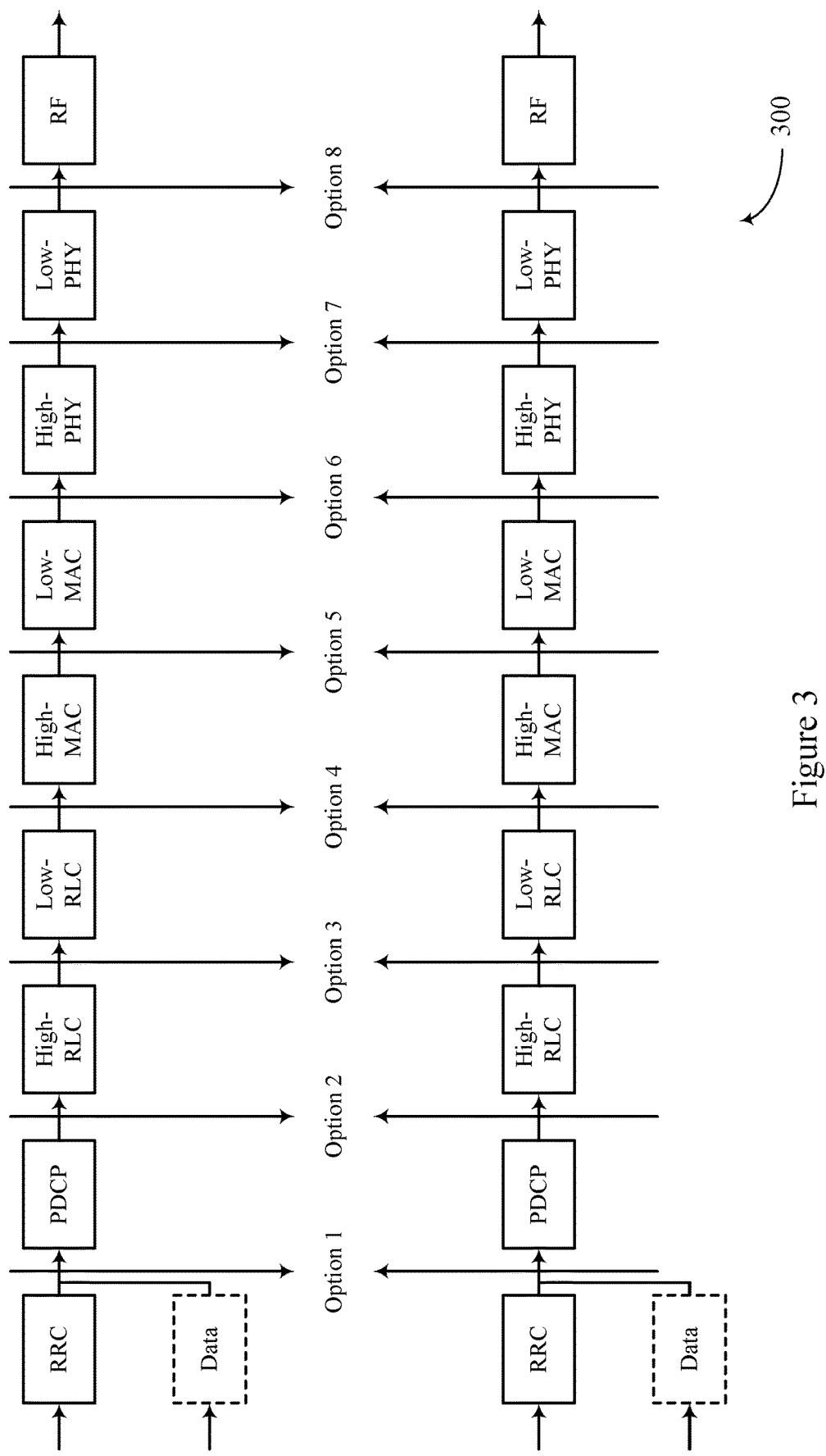
FIG. 3 illustrates examples of split options for protocol stack layers at control units (CUs) and DUs of a BS.

FIG. 3 illustrates examples of split options 300 for protocol stack layers at CUs and DUs of a BS. The split options 300 illustrate different split options 300 for splitting BS 105 (which may be an example of a BS 105 as described with reference to FIGS. 1 and 2) functionality between CU functionality, DU functionality, and, in some examples, RU functionality.

For instance, in examples in which the split options 300 illustrate single splits between CU functionality and DU functionality, option 1 may provide an example of a protocol stack layer split such that a CU includes an RRC layer and a DU includes a PDCP layer, high RLC layer, low RLC layer, high MAC layer, low MAC layer, high PHY layer, low PHY layer, and a radio frequency layer. Similarly, option 2 may provide an example of a protocol stack layer split such that a CU includes an RRC layer and a PDCP layer and a DU includes a high RLC layer, low RLC layer, high MAC layer, low MAC layer, high PHY layer, low PHY layer, and a radio frequency layer. The remainder of options 3, 4, 5, 6, 7, and 8 also may illustrate single splits between CU functionality and DU functionality.

In some other examples, the BS 105 also may include one or more RUs. In such examples, the protocol stack layers may feature double split options between CU functionality, DU functionality, and RU functionality. For example, the protocol stack layers may be split such that a PHY layer is in an RU (for example, both a high PHY layer and a low PHY layer are included in an RU functionality) or such that the PHY layer is partially in both an RU and a DU (for example, the high PHY layer is included in DU functionality and the low PHY layer is included in RU functionality). In an example of an option 2 and 6 split, for instance, a CU may include the RRC and PDCP layers, a DU may include the RLC and MAC layers, and an RU may include the PHY layer. Alternatively, in an example of an option 2 and 7 split (which may be referred to as 7.2× in some deployments, such as in open RAN (O-RAN) deployments), a CU may include the RRC and PDCP layers, a DU may contain the RLC, MAC, and high PHY layers, and an RU may contain the low PHY layer. Other double split options may similarly partition layers between a CU, a DU, and an RU.

In some aspects, a UE 115 may support communications with cells supported by different DUs under the same CU. In such aspects, the UE 115 may communicate with cells that have non-collocated PHY, MAC, and RLC layers and common PDCP and RRC layers. As such, although the UE 115 and the BS 105 may use L1/L2 signaling for mobility, there may be a lack of a path for data or control information from the PDCP layer to different RLC layers in some split configurations (such as in the examples of an option 2 and 6 split or a 7.2× split). As such, the UE 115 may transmit measurement results for a set of cells (as part of a mobility procedure) to a DU that is associated with that set of measured cells, which may result in a lack of shared knowledge between DUs of channel conditions of cells associated with different DUs. In some implementations, the UE 115 may provide measurement results associated with a set of cells of a second DU to a first DU different than the second DU to support shared knowledge between DUs of channel conditions of cells associated with different DUs.

Figure 4:
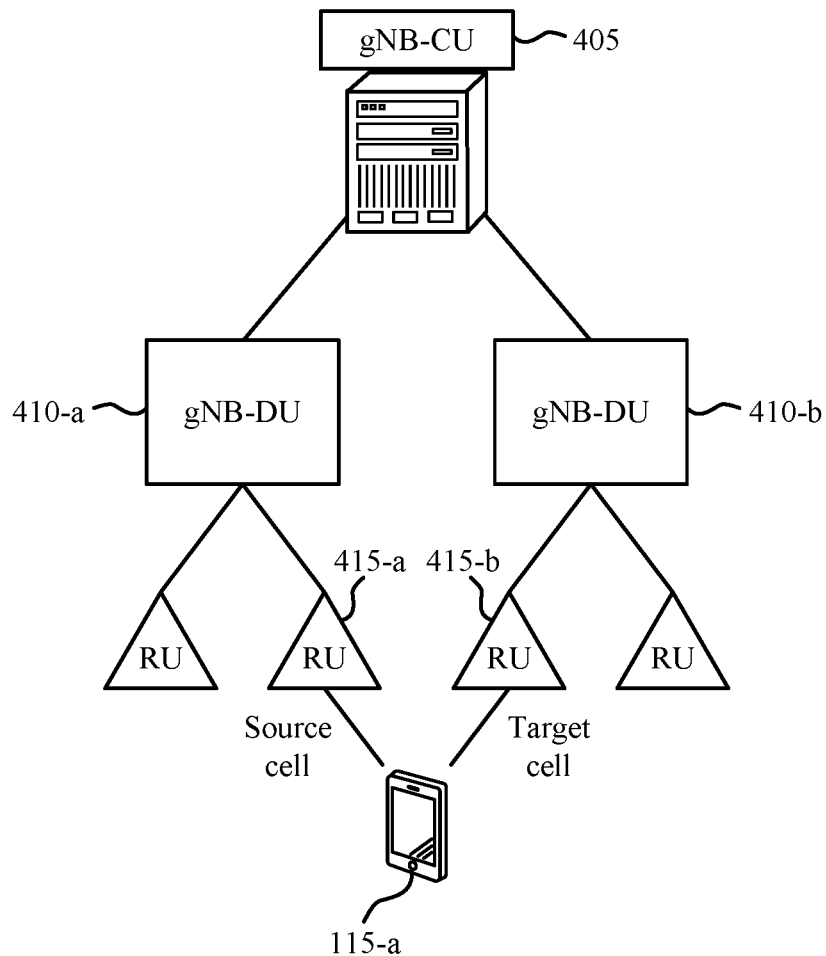
FIGS. 4 and 5 illustrate examples of wireless communications systems that support techniques for channel measurement reporting across different DUs of a BS.

FIG. 4 illustrates an example of a wireless communications system 400 that supports techniques for channel measurement reporting across different DUs of a BS. A UE 115, which may be an example of a UE 115 as described with reference to FIGS. 1-3, may support communications with cells supported by different DUs under a same CU of a BS 105, which may be an example of a BS 105 as also described with reference to FIGS. 1-3.

In the example of FIG. 4, the BS 105 may include a CU 405 controlling or otherwise supporting a first DU 410-*a* and a second DU 410-*b*, and each DU 410 may control or otherwise support one or more cells 415 (which may be equivalently referred to as one or more RUs). In some examples, after connecting and communicating with a source cell 415-*a*, the BS 105 may handover the UE 115-*a* to a target cell 415-*b* (for example, the target cell 415-*b* may provide a greater receive signal strength or channel metrics relative to what is provided by the source cell 415-*a*). In other words, the UE 115-*a* may perform a handover from the source cell 415-*a* supported by the first DU 410-*a* to the target cell 415-*b* supported by the second DU 410-*b*. The UE 115-*a* also may support communications with cells 415 supported by the same DU 410 under the same CU 405.

In some systems, although the UE 115-*a* may be performing the handover across cells 415 supported by the same CU 405, and the CU 405 includes the same L3 protocols (such as a same RRC layer), the BS 105 may still use L3 signaling to trigger handovers across these cells 415. The use of L3 signaling to facilitate handovers across cells 415 may be referred to as L3 mobility. Because L3 mobility involves RRC signaling however, L3 mobility may cause considerable delays in processing and signaling. As a result, the latency associated with performing a handover procedure (using L3 mobility) may be high. As described herein, the UE 115-*a* and the BS 105 may support efficient techniques for facilitating L1/L2 mobility to limit the latency associated with the mobility procedure and to support shared knowledge of channel conditions of cells 415 across various DUs 410 of the BS 105.

Figure 5:
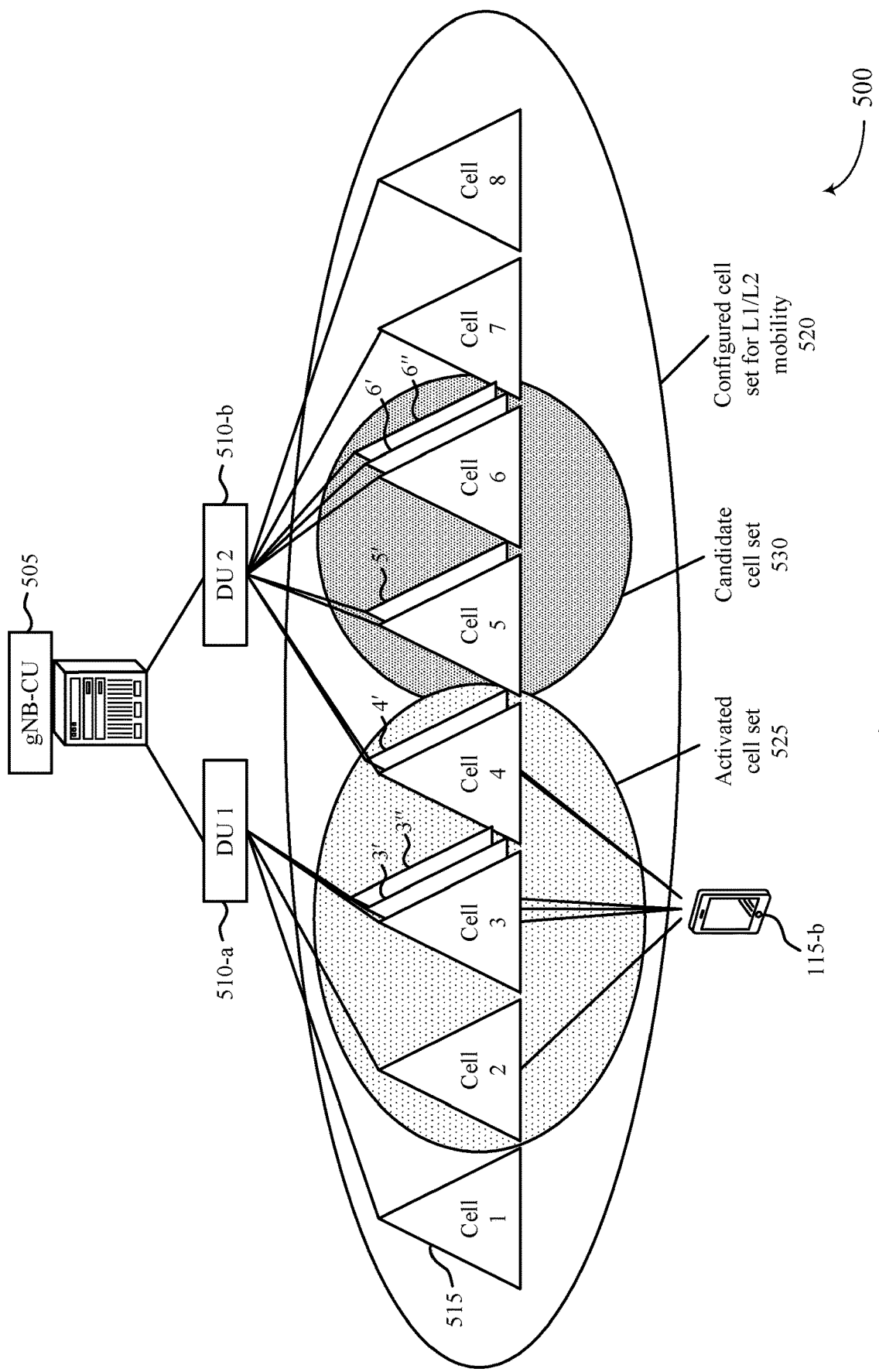

FIG. 5 illustrates an example of a wireless communications system 500 that supports techniques for channel measurement reporting across different DUs of a BS. The wireless communications system 500 may include a UE 115-*b*, which may be an example of a UE 115 as described with reference to FIGS. 1-4. The wireless communications system 500 also includes a BS 105, which may be an example of a BS 105 as described with reference to FIGS. 1-4, supporting a CU 505, a DU 510-*a* (which may be referred to as a first DU or a DU 1), and a DU 510-*b* (which may be referred to as a second DU or a DU 2).

The wireless communications system 500 may implement aspects of the wireless communications system 100. For example, the wireless communications system 500 may support efficient techniques for facilitating shared channel knowledge of cells 515 among both the DU 510-*a* and the DU 510-*b*. The DUs 510 may support multiple cells 515 and the UE 115-*b* may communicate with the BS 105 via one or more of the multiple cells 515. For example, the DU 510-*a* may control, operate, or otherwise support cells 1-3 and the DU 510-*b* may control, operate, or otherwise support cells 4-8. Further, as illustrated in the wireless communications system 500, the cell 3 may include the cell 3, a cell 3', and a cell 3", which may represent a carrier aggregation deployment at cell 3. Similarly, the cell 4 may include the cell 4 and a cell 4', the cell 5 may include the cell 5 and a cell 5', and the cell 6 may include the cell 6, a cell 6', and a cell 6", which also may represent carrier aggregation deployments at cells 4, 5, and 6, respectfully.

In some aspects, the BS 105 may transmit RRC signaling to the UE 115-*b* configuring a set of cells 515 for L1/L2 mobility, and the configured set of cells 515 for L1/L2 mobility may be referred to as an L1/L2 configured cell set 520. Each DU 510 supported by the BS 105 may have its own L1/L2 configured cell set, and the union of all configured cell sets across DUs 510 supported by the CU 505 may constitute an overall L1/L2 configured cell set 520. In some examples, the BS 105 may indicate, to the UE 115-*b* via RRC signaling, an L1/L2 configured cell set supported by each DU 510. In some other examples, the BS 105 may indicate, to the UE 115-*b* via the RRC signaling, the overall L1/L2 configured cell set 520 supported by all DUs 510.

The BS 105 also may indicate, via the RRC signaling, an L1/L2 activated cell set 525. The L1/L2 activated cell set 525 may refer to a group of cells 515 in the configured cell set 520 that are activated for communication and managed by L1/L2 signaling. Cells 515 in the L1/L2 activated cell set 525 may be used for control and data communications between the UE 115-*b* and the BS 105. Further, each DU 510 supported by the BS 105 may have its own L1/L2 activated cell set, and the union of all activated cell sets across DUs 510 may constitute an overall L1/L2 activated cell set 525. In some examples, the BS 105 may indicate, to the UE 115-*b* via the RRC signaling, an L1/L2 activated cell set supported by each DU 510. In some other examples, the BS 105 may indicate, to the UE 115-*b* via the RRC signaling, the overall L1/L2 activated cell set 525 supported by all DUs 510.

The BS 105 also may indicate, via the RRC signaling, an L1/L2 deactivated cell set. The L1/L2 deactivated cell set may refer to a group of cells 515 in the configured cell set 520 that are deactivated and managed by L1/L2 signaling. Cells 515 in the L1/L2 deactivated cell set may not be used for control and data communications between the UE 115-*b* and the BS 105 and can be activated by L1/L2 signaling. Further, each DU 510 supported by the BS 105 may have its own L1/L2 deactivated cell set, and the union of all deactivated cell sets across DUs 510 may constitute an overall L1/L2 deactivated cell set. In some examples, the BS 105 may indicate, to the UE 115-*b* via the RRC signaling, an L1/L2 deactivated cell set supported by each DU 510. In some other examples, the BS 105 may indicate, to the UE 115-*b* via the RRC signaling, the overall L1/L2 deactivated cell set supported by all DUs 510.

The BS 105 also may indicate, via the RRC signaling, an L1/L2 candidate cell set 530. The L1/L2 candidate cell set 530 may refer to a group of cells 515 in a deactivated cell set that may be autonomously added to the activated cell set 525 by the UE 115-*b*. Each DU 510 supported by the BS 105 may have its own L1/L2 candidate cell set, and the union of all candidate cell sets across DUs 510 may constitute an overall L1/L2 candidate cell set 530. In some examples, the BS 105 may indicate, to the UE 115-*b* via the RRC signaling, an L1/L2 candidate cell set supported by each DU 510. In some other examples, the BS 105 may indicate, to the UE 115-*b* via the RRC signaling, the overall L1/L2 candidate cell set 530 supported by all DUs 510. The UE 115-*b*, based on receiving the RRC signaling from the BS 105, may identify the configured cell set 520 for L1/L2 mobility, the activated cell set 525, the deactivated cell set, and the candidate cell set 530.

In some aspects, and as described in more detail with reference to FIG. 3, the functional split between the CU 505 and the DUs 510 may separate L1/L2 from L3 and the various cells 515 supported by the DUs 510 may have non-collocated PHY, MAC, and RLC layers. As such, in examples in which the UE 115-*b* measures a set of cells 515 as part of a mobility procedure (such as an L1/L2 mobility procedure), the UE 115-*b* may transmit measurement results for the set of cells 515 to a DU 510 that is associated with that set of cells 515 (and not to a DU 510 that is not associated with that set of cells 515). This may result in a lack of shared knowledge between DUs 510 of channel conditions of cells 515 controlled or otherwise supported by different DUs 510, which may cause sub-optimal cell activation or deactivation in some scenarios.

For example, the DU 510-*a* may control the cells 2 and 3 that are included within the activated cell set 525 and the DU 510-*a* may control the cells 7 and 8 that are included within the deactivated cell set. As part of an L1/L2 mobility procedure (for example, as part of maintenance of the activated cell set 525), the UE 115-*b* may measure each (if not all) of the cells 515 included in the configured cell set 520, including the cells 2, 3, 7, and 8. In some examples, the UE 115-*b* may transmit the channel measurement results associated with the cells 2 and 3 to the DU 510-*a* and may transmit the channel measurement results associated with the cells 7 and 8 to the DU 510-*b* and the DU 510-*a* and the DU 510-*b* may be unable to share the channel measurement results among each other. As such, if the UE 115-*b* is at an upper limit of cells 515 within the activated cell set 525 (such that any additions to the activated cell set 525 would exceed a capability of the UE 115-*b* or of the Uu link between the UE 115-*b* and the BS 105), the UE 115-*b* and the BS 105 may be unable to add the cell 7 or 8 to the activated cell set 525 even if the channel measurement results for cell 7 or 8 were better than the channel measurement results for cell 2 or 3, as the DU 510-*a* may be unaware of the relatively better channel measurement results associated with the cell 7 or 8 (and may therefore maintain cells 2 and 3 in the activated cell set 525, keeping the UE 115-*b* at the upper limit of cells 515 within the activated cell set 525).

In some implementations, the UE 115-*b* may transmit or otherwise provide measurement reports to a DU 510 for the L1/L2 configured cells belonging to a different DU 510 controlled by the same CU 505. As such, the UE 115-*b* and the BS 105 may experience more optimal activated cell management within a DU 510 and across all serving DUs 510. For example, the UE 115-*b* may transmit one or more measurement reports including channel measurements for the cells 515 controlled by the DU 510-*b* to the DU 510-*a*. Such signaling of measurement reports to a different DU 510 than the DU 510 controlling the cells 515 included in the measurement reports may be conveyed via L1, L2, or L3 signaling and may include separate or joint measurements in terms of activated/deactivated cells 515 (or beams of activated/deactivated cells 515). The UE 115-*b* may transmit the one or more measurement reports to the DU 510-*a* including channel measurement results for cells 515 controlled by the DU 510-*b* according to various reporting options, including a periodic reporting option, an aperiodic reporting option, or a semi-persistent reporting option. In some implementations, the UE 115-*b* may receive L1/L2 signaling from the BS 105 (from one or more of the DUs 510 supported by the BS 105), controlling which reporting option is activated or otherwise used by the UE 115-*b*. In some aspects, the L1/L2 signaling controlling which reporting option is activated may activate a reporting option from a previously configured (such as an RRC configured) list of reporting options.

The DU 510, or DUs 510, based on receiving the channel measurement results associated with cells 515 controlled by one or more different DUs 510, may account for the capability of the UE 115-*b* in terms of a number or quantity of L1/L2 activated cells within a DU 510 such that cells 515 associated with a greatest channel metric are activated across all serving DUs 510. Such a channel metric on the basis of which the DUs 510 may manage cell activation or deactivation for the UE 115-*b* may include a channel quality, a cell loading, or a mobility prediction, among other examples. For example, the cells 515 may be included within the activated cell set 525 based on having a greatest channel quality relative to other cells 515 across the DU 510-*a* and the DU 510-*b*, a cell loading relative to other cells 515 across the DU 510-*a* and the DU 510-*b*, or a projected or predicted motion tracking or proximity to the UE 115-*b* relative to other cells 515 across the DU 510-*a* and the DU 510-*b* (for example, based on inertial measurement at the UE 115-*b* or predicted or knowledge of movement of the UE 115-*b*).

In examples in which cells 515 are included within the activated cell set 525 based on a projected or predicted motion tracking or proximity to the UE 115-*b* relative to other cells 515 across the DU 510-*a* and the DU 510-*b*, the UE 115-*b* or the BS 105 may include cells 515 within the activated cell set 525 if those cells 515 are associated with (or are likely to be associated with) a relatively higher channel quality in the future (based on the movement of the UE 115-*b*), even if those cells 515 are associated with a relatively worse channel quality currently. In other words, the UE 115-*b* or the BS 105 may include one or more cells 515 within the activated cell set 525 if the UE 115-*b* is moving towards those one or more cells 515. Similarly, the UE 115-*b* and the BS 105 may remove one or more cells 515 from the activated cell set 525 if the UE 115-*b* is moving away from those one or more cells 515.

Further, the UE 115-*b* may provide the one or more measurement reports to diverse or various DUs 510 relative to the DU 510 controlling the cells 515 included in the one or more measurement reports according to various reporting approaches. In some implementations, for example, the UE 115-*b* may transmit the one or more measurement reports to a DU 510 for L1/L2 configured cells controlled by a different DU 510 (or different DUs 510). Such implementations may provide one or more DUs 510 of the BS 105 with more complete knowledge of the channel conditions measured by the UE 115-*b* with relatively fewer processing resources and with relatively little coordination among DUs 510. In some other implementations, the DUs 510 may share, among themselves, the one or more measurement reports (or related metrics) for the reported cells 515. For example, the UE 115-*b* may transmit one or more measurement reports to each DU 510 of the BS 105 including channel measurements for cells 515 controlled by that DU 510, and each DU 510 of the BS 105 may relay or otherwise share their respectively received measurement reports with other DUs 510 of the BS 105. Such channel measurement reporting may consume fewer over-the-air signaling resources, resulting in potentially lower channel congestion and greater spectral efficiency. Accordingly, in such implementations, transmitting a measurement report to the DU 510-*a* including measurement results of cells 515 controlled by the DU 510-*b* may include transmitting the measurement report to the DU 510-*b* and a relaying of the measurement report from the DU 510-*b* to the DU 510-*a*.

Additionally, the UE 115-*b* may transmit the one or more measurement reports to diverse or various DUs 510 relative to the DU 510 controlling the cells 515 included in the one or more measurement reports according to various reporting format options. In some examples, for instance, the UE 115-*b* may generate separate measurement reports including beam or cell quality rankings, or both, for each of an activated cell set and a deactivated cell set of one DU 510 and may transmit the separate measurement reports to a different DU 510. For example, the UE 115-*b* may generate a first measurement report including channel measurements for a set of activated cells 515 controlled by the DU 510-*b* and a second measurement report including channel measurements for a set of deactivated cells 515 controlled by the DU 510-*b* and may transmit the first measurement report and the second measurement report to the DU 510-*a*.

In such examples, the first measurement report may include a ranking of the set of activated cells 515 controlled by the DU 510-*b* or of beams associated with the set of activated cells 515 controlled by the DU 510-*b* (as well as any associated metrics, such as the metric according on which the ranking is based). The second measurement report may similarly include a ranking of the set of deactivated cells 515 controlled by the DU 510-*b* or of beams associated with the set of deactivated cells 515 controlled by the DU 510-*b* (as well as any associated metrics, such as the metric according on which the ranking is based). Alternatively, the separate measurement reports may include the channel measurements (without an explicitly reported ranking). In some aspects, the UE 115-*b* may report the channel measurements at a level or granularity based on whether the reported cells 515 are activated or not. For example, in some implementations, the first measurement report including the channel measurements for the activated cells of the DU 510-*b* may include beam-level reporting and the second measurement report including the channel measurements for the deactivated cells of the DU 510-*b* may include cell-level reporting.

Alternatively, in some other examples, the UE 115-*b* may generate a joint measurement report including beam or cell measurements, or both, for an activated cell set and a deactivated cell set of one DU 510 and may transmit the joint measurement report to a different DU 510. For example, the UE 115-*b* may generate a joint measurement report including channel measurements for both a set of activated cells 515 controlled by the DU 510-*b* and a set of deactivated cells 515 controlled by the DU 510-*b* and may transmit the joint measurement report to the DU 510-*a*. The joint measurement report may include a joint ranking of the set of activated and deactivated cells 515 controlled by the DU 510-*b* or of beams associated with the set of activated and deactivated cells 515 controlled by the DU 510-*b* (as well as any associated metrics, such as the metric according on which the ranking is based). Alternatively, the joint measurement report may include the channel measurements (without an explicitly reported ranking).

Additionally, or alternatively, the UE 115-*b* may extend the notion of separately reporting for activated and deactivated cell sets within a DU 510 to reporting for cells 515 or beams across all or a set of DUs 510 of the BS 105. For example, the UE 115-*b* may generate a first measurement report including channel measurements for a set of activated cells 515 controlled by a set of multiple DUs 510 (such as the DU 510-*a* and the DU 510-*b*) and a second measurement report including channel measurements for a set of deactivated cells 515 controlled by the set of multiple DUs 510. Alternatively, joint reporting across the set of DUs 510 may include the generation of a joint measurement report including channel measurements for both the set of activated cells 515 and the set of deactivated cells 515 controlled by the set of multiple DUs 510. In some aspects, the first measurement report and the second measurement report (or the joint measurement report) may include reports or measurements of a same set of synchronization signal blocks (SSBs) from the different DUs 510. For example, each cell 515 controlled by the set of multiple DUs 510 may transmit a same SSB (or a same set of SSBs, such that "same" may refer to a same SSB index or direction) and the one or more measurement reports may include a ranking of the cells 515 relative to the same SSB (or the same set of SSBs).

The UE 115-*b* may generate such a ranking via a comparison of a channel quality measured for each of the cells 515 for the same SSB. In some aspects, the one or more measurement reports may include an explicit indication of the same SSB on which each of the cells 515 are measured. For example, the UE 115-*b* may indicate an SSB1, a ranking or list of the measured cells 515 with respect to the SSB1 with cell identifiers (IDs), and the measured channel quality for each of the ranked cells 515. In some other aspects, the measurement reports may implicitly indicate the same SSB on which each of the cells 515 are measured (or the same SSB may be known to the cells 515). For example, the UE 115-*b* may receive a configuration (such as a pre-configuration received via RRC signaling) indicating which cells 515 can be measured for the SSB1 and, as such, the UE 115-*b* may transmit channel measurements and a ranking of the cells 515 with the configured association with the SSB1. Similarly, the UE 115-*b* may receive signaling requesting channel measurements for some cells 515 with respect to an indicated SSB. For instance, the UE 115-*b* may receive signaling requesting channel measurements of (all) activated cells for the SSB1. In such examples in which the one or more measurement reports include a ranking of the cells 515 relative to the same SSB, the cells 515 may obtain knowledge of a channel quality associated with each measured cell 515 or of how the measured cells 515 compare to each other regardless of which DU 510 controls the measured cells 515.

In some implementations, the UE 115-*b* may receive a configuration (such as an RRC configuration) of a set of reporting parameters that the UE 115-*b* may include in the one or more measurement reports. Such a set of reporting parameters may include a cell set to report, a number of beams or cells 515 to report, a periodicity for transmitting the one or more measurement reports, or a trigger for transmitting the one or more measurement reports, among other examples. The reporting parameter of the cell set to report may indicate, to the UE 115-*b*, which set of cells 515 to include within a measurement report (such as whether to include a set of activated cells 515 of one DU 510 or a set of deactivated cells 515 of one DU 510, or both, or whether to include cells 515 of multiple DUs 510) and the reporting parameter of the number of beams or cells 515 to report may indicate, to the UE 115-*b*, a quantity of beams or cells 515 that the UE 115-*b* may include within a measurement report.

In some aspects, the UE 115-*b* may receive signaling (such as L1/L2 signaling) activating or deactivating one or more reporting parameters of the configured set of reporting parameters. For example, the UE 115-*b* may receive such activation/deactivation signaling from the DU 510 to which reporting is done or from the DU 510 controlling the cells 515 being reported. In examples in which the UE 115-*b* receives such activation/deactivation signaling from the DU 510 controlling the cells 515 being reported, the DU 510 may have information about cell status (which cells 515 that are controlled by the DU 510 are activated or deactivated) and may have more accurate channel quality or loading information relative to the DU 510 to which reporting is done. As such, the DU 510 controlling the cells being reported may have greater insight into which reporting parameters are most applicable to current channel or cell conditions. Further, in examples in which such activation/deactivation signaling is received from the DU 510 to which reporting is done, the DU 510 to which reporting is done may receive signaling from the DU 510 controlling the cells 515 being reported (the other DU 510) indicating or otherwise suggesting activation or deactivation of one or more reporting parameters. In such examples, the DUs 510 may coordinate on which reporting parameters are activated or deactivated.

In some other aspects, the UE 115-*b* may activate or deactivate one or more reporting parameters of the configured set of reporting parameters. For example, the UE 115-*b* may have information about the status of all serving cells 515 and the channel quality of all serving cells 515 (as the UE 115-*b* may directly measure all serving cells 515), which may provide the UE 115-*b* with insight into which reporting parameters are most applicable to current channel or cell conditions. Further, the UE 115-*b* may transmit signaling to the DU 510 to which reporting is done or to the DU 510 controlling the cells 515 being reported to indicate or otherwise suggest activation or deactivation of one or more reporting parameters. The UE 115-*b* may transmit such an indication or suggestion to a DU 510 via L1/L2 signaling, such as via uplink control information (UCI) (such as a specific format of UCI) or a MAC control element (MAC-CE). In such examples, the UE 115-*b* and the DUs 510 may coordinate on which reporting parameters are activated or deactivated.

Further, although described herein in the context of a downlink-based channel measurement procedure in which the UE 115-*b* performs channel measurements and reports the measurements to the serving DU 510 or to a different DU 510, or both, the described techniques of facilitating more complete channel knowledge among multiple DUs 510 also may be applied to uplink-based channel measurement procedures in which the UE 115-*b* transmits one or more reference signals and the cells 515 in the configured cell set 520 perform channel measurements on the one or more reference signals. For example, the UE 115-*b* may receive a configuration from the BS 105 (via one or more cells 515) of a set of resources over which the UE 115-*b* may transmit an uplink reference signal, such as a sounding reference signal (SRS), to each (if not all) cell 515 of the configured cell set 520. In some aspects, the configured set of resources may include a common set of time and frequency resources (for example, a common set of SRS time and frequency resources) across the multiple DUs 510 of the BS 105 such that the common resources are used across an entirety of the L1/L2 configured cell set 520.

In such examples in which the UE 115-*b* transmit an uplink reference signal over a common set of resources to each cell 515 of the configured cell set 520, the multiple DUs 510 controlling the cells 515 that receive the uplink reference signal may coordinate on the channel measurements obtained by each cell 515 of the configured cell set 520. For example, the DU 510-*a* may transmit or otherwise provide channel measurements obtained by the cells 1-3 to the DU 510-*b* and the DU 510-*b* may similarly transmit or otherwise provide channel measurements obtained by the cells 4-8 to the DU 510-*a*. In some implementations, the UE 115-*b* and the DUs 510 may exchange L1/L2 signaling to update the uplink-based channel measurement procedure based on one or more pre-configured options. For example, the UE 115-*b* and the DUs 510 may exchange L1/L2 signaling to switch between different sets of common resources or to adjust (such as to add or remove time or frequency resources) the common resource over which the UE 115-*b* may transmit the uplink reference signal to the cells 515 of the configured cell set 520. As such, the cells 515 in the configured cell set 520 may monitor for the uplink reference signal over the common set of resources, measure the uplink reference signal, and perform beam refinement based on the measurements.

Alternatively, the UE 115-*b* and the DUs 510 may employ a combination of downlink- and uplink-based channel measurements such that the UE 115-*b* may measure downlink reference signals transmitted over one or more beams from at least a subset of the cells 515 in the configured cell set 520 and may additionally transmit an uplink reference signal over one or more beams to at least a subset of the cells 515 in the configured cell set 520 over a configured common set of resources. Such a combination of downlink- and uplink-based channel measurements may involve different reporting types (such as either downlink-based channel measurements or uplink-based channel measurements) that are configured within a DU 510 and across the DU 510 to which reporting is done.

In some aspects, the BS 105, or one of the DUs 510 of the BS 105, may select one or more cells 515 of the configured cell set 520 for communication with the UE based on the received channel measurements (in examples in which the UE 115-*b* and the BS 105 perform downlink-based channel measurements) or based on the measurements obtained by the cells 515 of the configured cell set 520 (in examples in which the UE 115-*b* and the BS 105 perform uplink-based channel measurements). For example, the BS 105, or one of the DUs 510 of the BS 105, may activate or deactivate one or more cells 515 to or from the activated cell set 525 based on the channel measurements. In some examples, the UE 115-*b* may receive signaling indicating the activation or deactivation of the one or more cells 515 via L1/L2 signaling.

Figure 6:
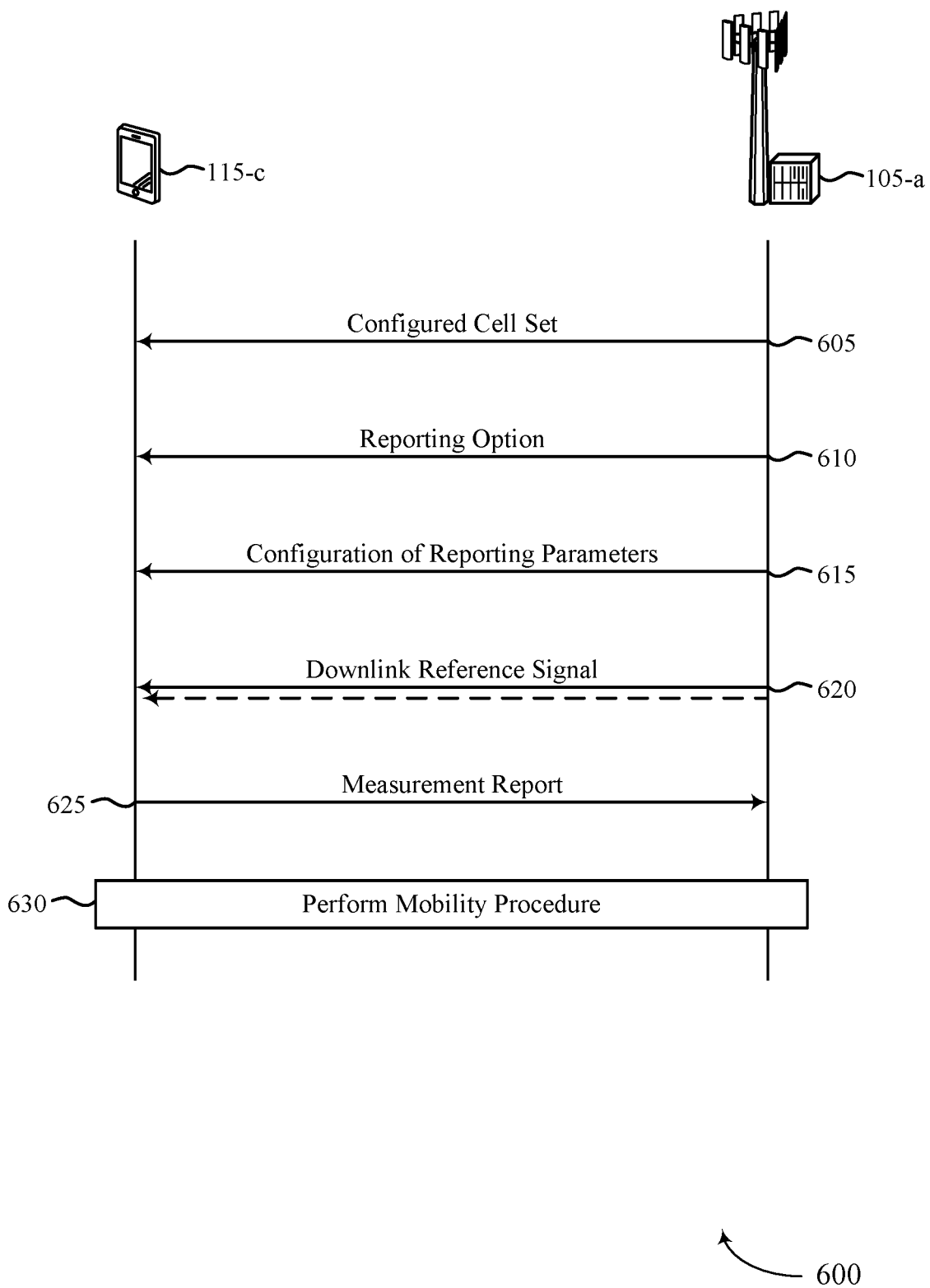
FIGS. 6 and 7 illustrate examples of process flows that support techniques for channel measurement reporting across different DUs of a BS.

FIG. 6 illustrates an example of a process flow 600 that supports techniques for channel measurement reporting across different DUs of a BS. The process flow 600 illustrates aspects of techniques performed by a UE 115-*c*, which may be an example of a UE 115 described with reference to FIGS. 1-5. The process flow 600 also illustrates aspects of techniques performed by a BS 105-*a*, which may be an example of a BS 105 described with reference to FIGS. 1-5. The process flow may illustrate aspects of the wireless communications system 500. For example, the UE 115-*c* may transmit, to a first DU of the BS 105-*a*, one or more measurement reports including channel measurements associated with one or more cells controlled by or otherwise associated with a second DU as part of an L1/L2 mobility procedure.

In the following description of process flow 600, the operations may be performed (reported or provided) in a different order than the order shown, or the operations performed by the UE 115-*c* and the BS 105-*a* may be performed in different orders or at different times. For example, specific operations also may be left out of process flow 600, or other operations may be added to process flow 600. Further, although some operations or signaling may be shown to occur at different times for discussion purposes, these operations may actually occur at the same time.

At 605, the UE 115-*c* may receive, from the BS 105-*a*, an indication of a configured cell set associated with (controlled by) a set of multiple DUs of the BS 105-*a*. In some examples, the configured cell set may be an example of a configured cell set for L1/L2 mobility and, as such, may be referred to as an L1/L2 configured cell set. In some aspects, the UE 115-*c* may receive the indication of the configured cell set from the BS 105-*a* via RRC signaling.

At 610, the UE 115-*c* may receive, from the BS 105-*a*, an activation of a reporting option for one or more measurement reports. In some examples, the UE 115-*c* may receive the activation via L1/L2 signaling and the activation may indicate or otherwise activate a reporting option from a list of pre-configured (such as RRC configured) reporting options at the UE 115-*c*. In some aspects, the list of pre-configured reporting options may include a periodic reporting option, an aperiodic reporting option, or a semi-persistent reporting option.

At 615, the UE 115-*c* may receive, from the BS 105-*a*, a configuration of a set of reporting parameters. In some examples, the UE 115-*c* may generate the one or more measurement reports based on the configuration of the set of reporting parameters and based on which of the configured reporting parameters are activated. For example, the UE 115-*c* may receive the configuration of the set of reporting parameters from the BS 105-*a* via RRC signaling and the UE 115-*c* may transmit or receive signaling (such as L1/L2 signaling) activating or deactivating one or more reporting parameters of the configured set of reporting parameters. In examples in which the UE 115-c receives signaling activating or deactivating one or more reporting parameters, the UE 115-c may receive the signaling from a DU to which the UE 115-c may transmit the one or more measurement reports or from a DU controlling the cells included in the one or more measurement reports.

At 620, the UE 115-c may receive a downlink reference signal from each cell of the configured cell set of the BS 105-a. In some examples, the UE 115-c may measure a signal strength for the downlink reference signal received from each cell of the configured cell set over one or more beams (which may include one or more transmit beams of the cells of the configured cell set or one or more receive beams of the UE 115-c, or both). As such, the UE 115-c may obtain channel measurements associated with each cell of the configured cell set as part of a downlink-based channel measurement procedure. In some implementations, the UE 115-c may measure the downlink reference signal received from each cell based on the activated reporting parameters or other channel metrics that the UE 115-c may include in the one or more measurement reports or according to which the UE 115-c may rank the cells of the configured cell set. In some aspects, for each measured cell, the UE 115-c may average a received signal strength across a number of beams used by that measured cell or used by the UE 115-c, or both.

At 625, the UE 115-c may transmit, to a first DU of a set of DUs of the BS 105-a, one or more measurement reports including channel measurement results for at least a subset of cells of the configured cell set. In some examples, for instance, the one or more measurement reports may include channel measurement results for cells controlled by or otherwise supported by a second DU different than the first DU. In some other examples, the one or more measurement reports may include channel measurements for cells controlled by or otherwise supported by a set of DUs different than (and potentially including) the first DU. For example, in some implementations, the one or more measurement reports may include channel measurement results for all cells of the configured cell set that are configured with all of the set of DUs of the BS 105-a. Additional details relating to the one or more measurement reports are described herein, including with reference to FIG. 5.

At 630, the UE 115-c and the BS 105-c may perform a mobility procedure (such as an L1/L2 mobility procedure) based on the channel measurement results and the sharing of channel knowledge between and among the set of DUs of the BS 105-a. In some examples, the mobility procedure may include a selection, by the UE 115-c, of one or more cells of the configured cell set for communication with the BS 105-a. In some other examples, the mobility procedure may include receiving signaling from the BS 105-a (via one or more DUs of the BS 105-a) activating or deactivating one or more cells of the configured cell set for communication with the BS 105-a.

Figure 7:
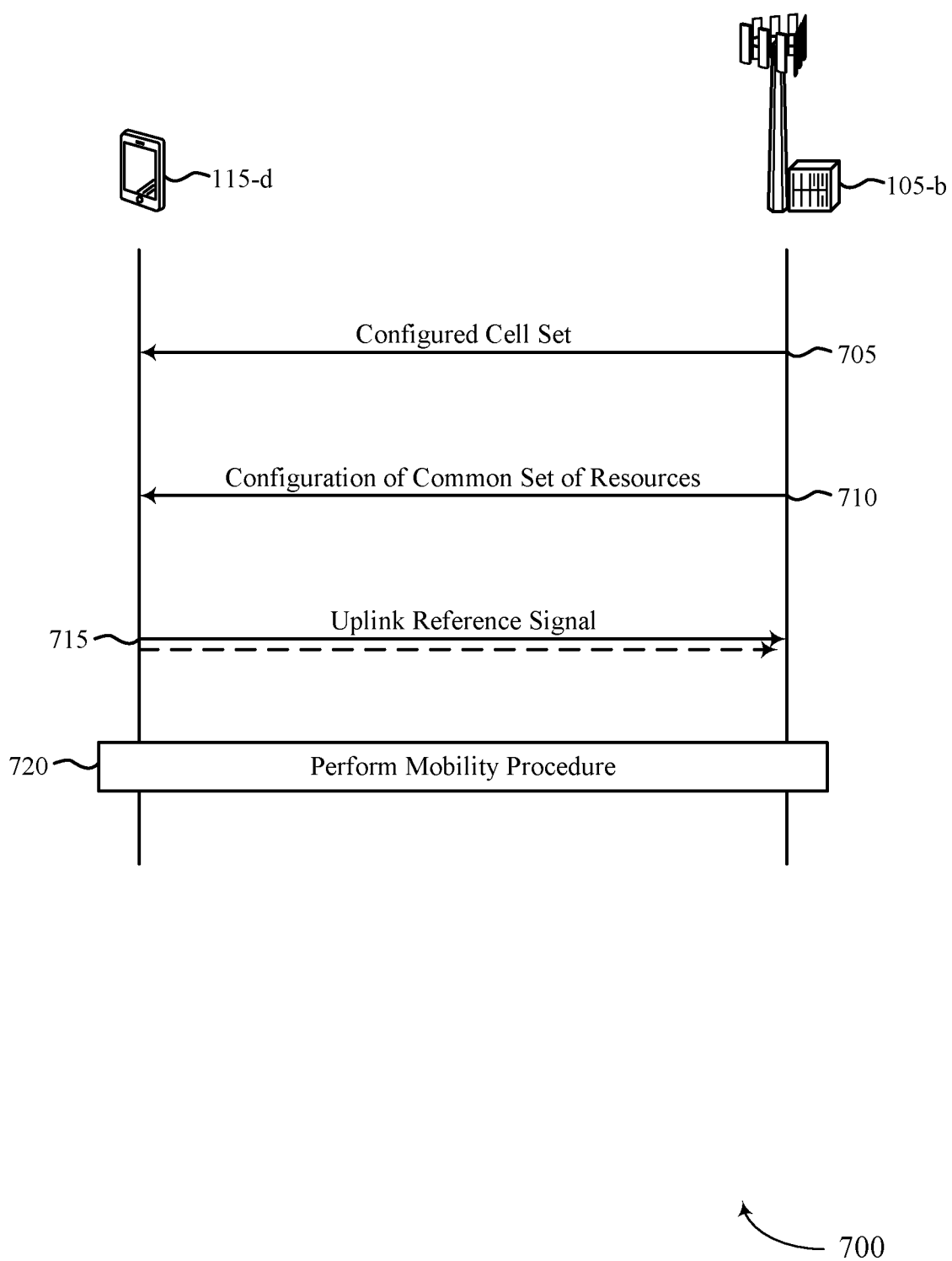

FIG. 7 illustrates an example of a process flow 700 that supports techniques for channel measurement reporting across different DUs of a BS. The process flow 700 illustrates aspects of techniques performed by a UE 115-d, which may be an example of a UE 115 described with reference to FIGS. 1-6. The process flow 700 also illustrates aspects of techniques performed by a BS 105-b, which may be an example of a BS 105 described with reference to FIGS. 1-6. The process flow may illustrate aspects of the wireless communications system 500. For example, the UE 115-d may transmit one or more uplink reference signals to each cell of a configured cell set (such as an L1/L2 configured cell set) of the BS 105-b for uplink channel measurement between the UE 115-d and each cell of the configured cell set as part of an L1/L2 mobility procedure.

In the following description of process flow 700, the operations may be performed (reported or provided) in a different order than the order shown, or the operations performed by the UE 115-d and the BS 105-b may be performed in different orders or at different times. For example, specific operations also may be left out of process flow 700, or other operations may be added to process flow 700. Further, although some operations or signaling may be shown to occur at different times for discussion purposes, these operations may actually occur at the same time.

At 705, the UE 115-d may receive, from the BS 105-b, an indication of a configured cell set associated with (controlled by) a set of multiple DUs of the BS 105-b. In some examples, the configured cell set may be an example of a configured cell set for L1/L2 mobility and, as such, may be referred to as an L1/L2 configured cell set. In some aspects, the UE 115-d may receive the indication of the configured cell set from the BS 105-b via RRC signaling.

At 710, the UE 115-d may receive, from the BS 105-b, a configuration of a common set of resources for an uplink channel measurement between the UE 115-d and each cell of the configured cell set. In some examples, the common set of resources may be an example of a common set of time and frequency resources over which the UE 115-d may transmit an uplink reference signal to the BS 105-b. In some aspects, the UE 115-d may receive the configuration of the common set of resources via RRC signaling and may additionally receive L1/L2 signaling to update or switch between various pre-configured (or RRC configured) options.

At 715, the UE 115-d may transmit, to each cell of the configured cell set, an uplink reference signal over the common set of resources for measurement at each DU of a set of DUs of the BS 105-b. The uplink reference signal may be an SRS or an uplink demodulation reference signal (DMRS), among other examples. The BS 105-b may likewise receive, via each cell of the configured cell set, the uplink reference signal over the common set of resources and may perform an uplink channel measurement for each cell of the configured cell set at each DU of the set of DUs of the BS 105-b.

At 720, the UE 115-d and the BS 105-b may perform the mobility procedure based on the channel measurements obtained by the BS 105-b. In some examples, the mobility procedure may include a selection, by the BS 105-b, of one or more cells of the configured cell set for communication with the UE 115-d based on the uplink channel measurement for each cell of the configured cell set. In such examples, the BS 105-b may transmit (via L1/L2 signaling) an indication of the selection to the UE 115-d.

Figure 8:
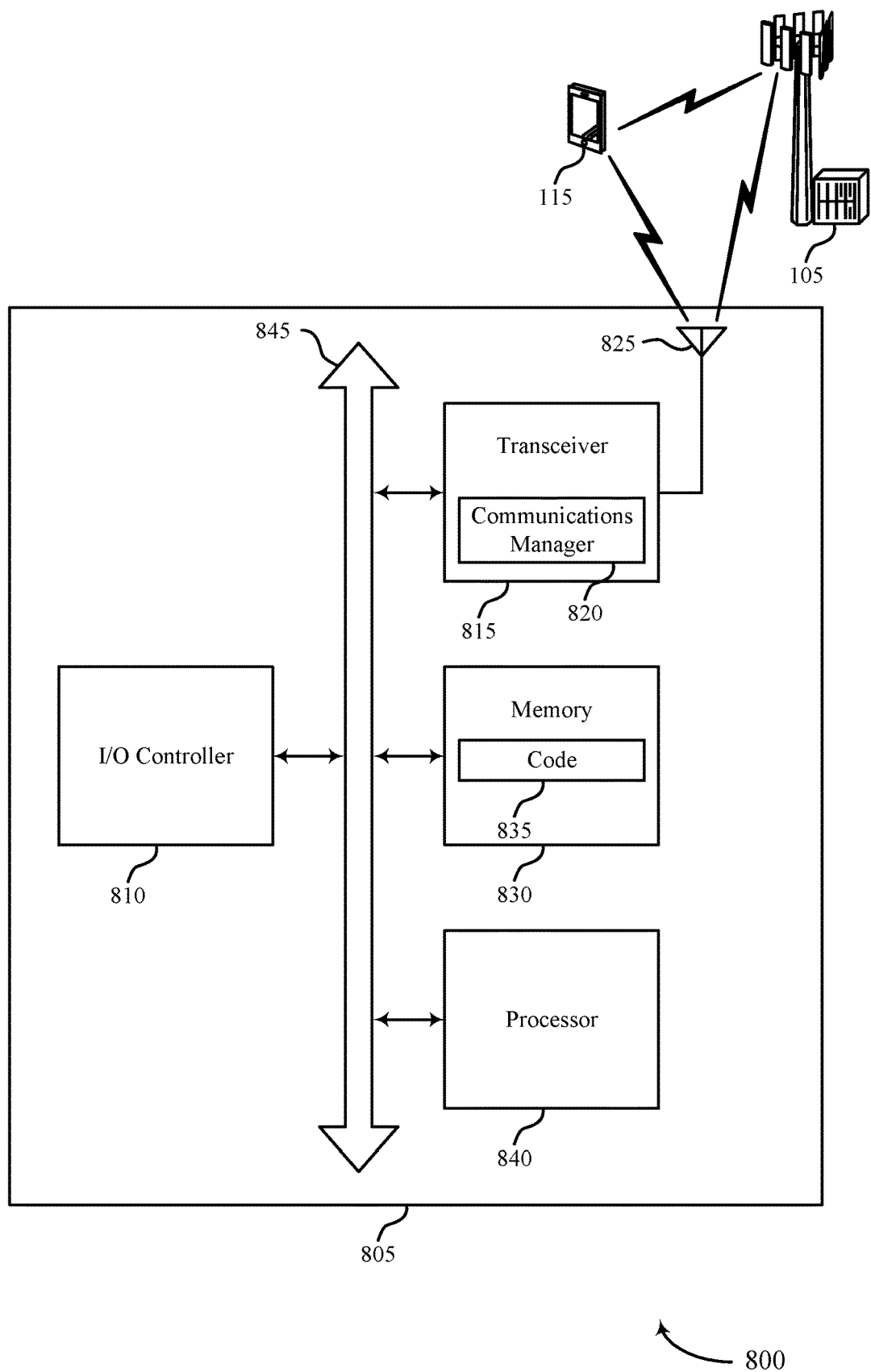
FIGS. 8 and 9 show block diagrams of example devices that support techniques for channel measurement reporting across different DUs of a BS.

FIG. 8 shows a block diagram 800 of an example device 805 that supports techniques for channel measurement reporting across different DUs of a BS. The device 805 may be an example of or include the components of a UE 115 as described herein, including with reference to FIGS. 1-8. The device 805 may communicate wirelessly with one or more BSs 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (for example, operatively, communicatively, functionally, electronically, electrically) via one or more buses (for example, a bus 845).

The communications manager 820 may support wireless communication at a UE in accordance with examples as disclosed herein. The communications manager 820 may be configured as or otherwise support a means for receiving an indication of a configured cell set associated with a set of multiple DUs of a BS. In some examples, the communications manager 820 may be configured as or otherwise support a means for performing a channel measurement for each cell of the configured cell set as part of a mobility procedure. In some examples, the communications manager 820 may be configured as or otherwise support a means for transmitting, to a first DU of the set of multiple DUs, one or more measurement reports including channel measurement results for at least a subset of cells of the configured cell set.

In some examples, to support transmitting the one or more measurement reports, the communications manager 820 may be configured as or otherwise support a means for transmitting, to the first DU, a first measurement report including channel measurement results for each activated cell associated with a second DU of the set of multiple DUs and a second measurement report including channel measurement results for each deactivated cell associated with the second DU. In some examples, to support transmitting the one or more measurement reports, the communications manager 820 may be configured as or otherwise support a means for transmitting, to the first DU, a joint measurement report including channel measurement results for each activated cell associated with a second DU of the set of multiple DUs and channel measurement results for each deactivated cell associated with the second DU.

In some examples, to support transmitting the one or more measurement reports, the communications manager 820 may be configured as or otherwise support a means for transmitting, to the first DU, a first measurement report including channel measurement results for each activated cell associated with a set of DUs of the set of multiple DUs and a second measurement report including channel measurement results for each deactivated cell associated with the set of DUs. In some examples, the channel measurement results for each activated cell associated with the set of DUs and the channel measurement results for each deactivated cell associated with the set of DUs indicate rankings of the set of DUs with respect to an SSB transmitted from each cell of the set of DUs.

In some examples, the communications manager 820 may be configured as or otherwise support a means for receiving, from the BS, an activation of a reporting option for the one or more measurement reports. In some examples, the reporting option may be one of periodic reporting, aperiodic reporting, or semi-persistent reporting. In some examples, the communications manager 820 may be configured as or otherwise support a means for receiving, from the BS, a configuration of a set of reporting parameters. In some examples, the one or more measurement reports are based on the configuration of the set of reporting parameters.

In some examples, the communications manager 820 may be configured as or otherwise support a means for receiving signaling indicating an activation or a deactivation of one or more of the set of reporting parameters. In some examples, the signaling indicating the activation or the deactivation of the one or more of the set of reporting parameters is received from the first DU or a second DU of the set of multiple DUs. In some examples, the communications manager 820 may be configured as or otherwise support a means for transmitting, to the BS, signaling indicating an activation or a deactivation of one or more of the set of reporting parameters.

In some examples, the set of reporting parameters includes a cell set for which to report in each of the one or more measurement reports, a quantity of beams to include in the one or more measurement reports, a quantity of cells to include in the one or more measurement reports, a periodicity for the transmitting of the one or more measurement reports, a trigger for the transmitting of the one or more measurement reports, or any combination thereof. In some examples, the communications manager 820 may be configured as or otherwise support a means for receiving a downlink reference signal from each cell of the configured cell set. In some examples, the communications manager 820 may be configured as or otherwise support a means for measuring a signal strength for the downlink reference signal from each cell of the configured cell set over one or more beams. In some examples, performing the channel measurement for each cell of the configured cell set is based on measuring the signal strength for the downlink reference signal from each cell of the configured cell set over the one or more beams.

In some examples, to support mobility procedure, the communications manager 820 may be configured as or otherwise support a means for selecting one or more cells of the configured cell set for communication with the BS based on the channel measurement for each cell of the configured cell set. In some examples, to support mobility procedure, the communications manager 820 may be configured as or otherwise support a means for receiving signaling activating or deactivating one or more cells of the configured cell set for communication with the BS in response to the one or more measurement reports.

Additionally, or alternatively, the communications manager 820 may support wireless communication at a UE in accordance with examples as disclosed herein. In some examples, the communications manager 820 may be configured as or otherwise support a means for receiving an indication of a configured cell set associated with a set of multiple DUs of a BS. In some examples, the communications manager 820 may be configured as or otherwise support a means for receiving, from the BS, a configuration of a common set of resources for an uplink channel measurement between the UE and each cell of the configured cell set, and the common set of resources may be used across the configured cell set that is associated with the set of DUs of the BS. In some examples, the communications manager 820 may be configured as or otherwise support a means for transmitting, to each cell of the configured cell set, an uplink reference signal over the common set of resources. In some examples, the uplink reference signal includes an SRS.

The I/O controller 810 may manage input and output signals for the device 805. The I/O controller 810 also may manage peripherals not integrated into the device 805. In some examples, the I/O controller 810 may represent a physical connection or port to an external peripheral. In some examples, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some examples, the I/O controller 810 may be implemented as part of a processor, such as the processor 840. In some examples, a user may interact with the device 805 via the I/O controller 810 or via hardware components controlled by the I/O controller 810.

In some examples, the device 805 may include a single antenna 825. However, in some other examples, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 also may include a modem to modulate the packets, to provide the modulated packets to one or more antennas 825 for transmission, and to demodulate packets received from the one or more antennas 825.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some examples, the code 835 may not be directly executable by the processor 840 but may cause a computer (for example, when compiled and executed) to perform functions described herein.

In some examples, the memory 830 may contain, among other things, a basic I/O system (BIOS) which may control basic hardware or software operation such as the interaction with peripheral components or devices.

In some implementations, the processor 1140 may be a component of a processing system. A processing system may generally refer to a system or series of machines or components that receives inputs and processes the inputs to produce a set of outputs (which may be passed to other systems or components of, for example, a UE 115). For example, a processing system of a UE 115 may refer to a system including the various other components or subcomponents of a UE 115.

The processing system of the UE 115 may interface with other components of the UE 115 and may process information received or obtained from other components (such as inputs or signals) and output information to other components. For example, a chip or modem of the UE 115 may include a processing system, a first interface to receive or obtain information, and a second interface to output, transmit, or provide information. In some implementations, the first interface may refer to an interface between the processing system of the chip or modem and a receiver, such that the UE 115 may receive information or signal inputs, and the information may be passed to the processing system. In some implementations, the second interface may refer to an interface between the processing system of the chip or modem and a transmitter, such that the UE 115 may transmit information output from the chip or modem. A person having ordinary skill in the art will readily recognize that the second interface also, or alternatively, may obtain or receive information or signal inputs, and the first interface also, or alternatively, may output, transmit, or provide information.

By including or configuring the communications manager 820 in accordance with examples as described herein, the device 805 may support techniques for reduced latency, more efficient utilization of communication resources, greater coordination between devices, longer battery life, and greater utilization of processing capability.

In some examples, the communications manager 820 may be configured to perform various operations (for example, receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for channel measurement reporting across different DUs of a BS as described herein, or the processor 840 and the memory 830 may be otherwise configured to perform or support such operations.

Figure 9:
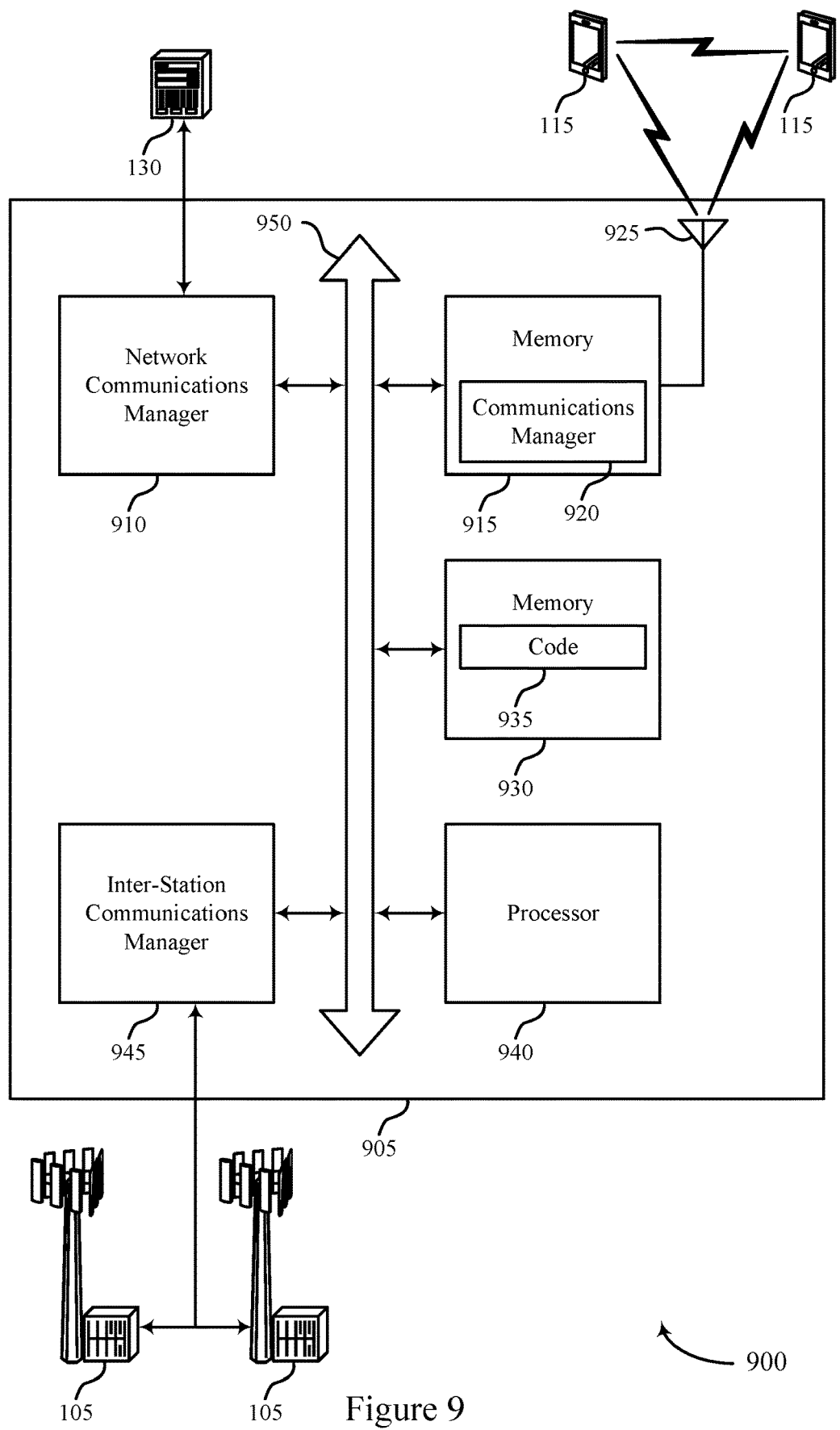

FIG. 9 shows a block diagram 900 of an example device 905 that supports techniques for channel measurement reporting across different DUs of a BS. The device 905 may be an example of or include the components of a BS 105 as described herein, including with reference to FIGS. 1-8. The device 905 may communicate wirelessly with one or more BSs 105, UEs 115, or any combination thereof. The device 905 may include components for bi-directional voice and data communications including components for transmitting and receiving communications, such as a communications manager 920, a network communications manager 910, a transceiver 915, an antenna 925, a memory 930, code 935, a processor 940, and an inter-station communications manager 945. These components may be in electronic communication or otherwise coupled (for example, operatively, communicatively, functionally, electronically, electrically) via one or more buses (for example, a bus 950).

The communications manager 920 may support wireless communication at a BS in accordance with examples as disclosed herein. The communications manager 920 may be configured as or otherwise support a means for transmitting, to a UE, an indication of a configured cell set associated with a set of multiple DUs of the BS. In some examples, the communications manager 920 may be configured as or otherwise support a means for receiving, from the UE and at a first DU of the set of multiple DUs, one or more measurement reports including channel measurement results for at least a subset of cells of the configured cell set. In some examples, the communications manager 920 may be configured as or otherwise support a means for selecting one or more cells of the configured cell set for communication with the UE based on the channel measurement results for at least the subset of cells of the configured cell set.

In some examples, to support receiving the one or more measurement reports, the communications manager 920 may be configured as or otherwise support a means for receiving, at the first DU, a first measurement report including channel measurement results for each activated cell associated with a second DU of the set of multiple DUs and a second measurement report including channel measurement results for each deactivated cell associated with the second DU. In some examples, to support receiving the one or more measurement reports, the communications manager 920 may be configured as or otherwise support a means for receiving, at the first DU, a joint measurement report including channel measurement results for each activated cell associated with a second DU of the set of multiple DUs and channel measurement results for each deactivated cell associated with the second DU.

In some examples, to support receiving the one or more measurement reports, the communications manager 920 may be configured as or otherwise support a means for receiving, at the first DU, a first measurement report including channel measurement results for each activated cell associated with a set of DUs of the set of multiple DUs and a second measurement report including channel measurement results for each deactivated cell associated with the set of DUs. In some examples, the channel measurement results for each activated cell associated with the set of DUs and the channel measurement results for each deactivated cell associated with the set of DUs indicate rankings of the set of DUs with respect to an SSB transmitted from each cell of the set of DUs.

In some examples, the communications manager 920 may be configured as or otherwise support a means for transmitting, to the UE, an activation of a reporting option for the one or more measurement reports. In some examples, the communications manager 920 may be configured as or otherwise support a means for transmitting, to the UE, a configuration of a set of reporting parameters. In some examples, the one or more measurement reports are based on the configuration of the set of reporting parameters. In some examples, the communications manager 920 may be configured as or otherwise support a means for transmitting, from the first DU to each of a remainder of the set of multiple DUs of the BS, the one or more measurement reports including the channel measurement results for at least the subset of cells of the configured cell set.

Additionally, or alternatively, the communications manager 920 may support wireless communication at a BS in accordance with examples as disclosed herein. In some examples, the communications manager 920 may be configured as or otherwise support a means for transmitting, to a UE, an indication of a configured cell set associated with a set of multiple DUs of the BS. In some examples, the communications manager 920 may be configured as or otherwise support a means for transmitting, to the UE, a configuration of a common set of resources for an uplink channel measurement between the UE and each cell of the configured cell set. In some examples, the common set of resources are used across the configured cell set that is associated with the set of multiple DUs of the BS. In some examples, the communications manager 920 may be configured as or otherwise support a means for receiving, via each cell of the configured cell set, an uplink reference signal over the common set of resources.

In some examples, the communications manager 920 may be configured as or otherwise support a means for performing the uplink channel measurement for each cell of the configured cell set at each DU of the set of multiple DUs based on the uplink reference signal. In some examples, the communications manager 920 may be configured as or otherwise support a means for selecting one or more cells of the configured cell set for communication with the UE based on the uplink channel measurement for each cell of the configured cell set. In some examples, the uplink reference signal includes an SRS.

The network communications manager 910 may manage communications with a core network 130 (for example, via one or more wired backhaul links). For example, the network communications manager 910 may manage the transfer of data communications for client devices, such as one or more UEs 115.

In some examples, the device 905 may include a single antenna 925. However, in some other examples the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 also may include a modem to modulate the packets, to provide the modulated packets to one or more antennas 925 for transmission, and to demodulate packets received from the one or more antennas 925.

The memory 930 may include RAM and ROM. The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some examples, the code 935 may not be directly executable by the processor 940 but may cause a computer (for example, when compiled and executed) to perform functions described herein. In some examples, the memory 930 may contain, among other things, a BIOS which may control basic hardware or software operation such as the interaction with peripheral components or devices.

In some implementations, the processor 940 may be a component of a processing system. A processing system may generally refer to a system or series of machines or components that receives inputs and processes the inputs to produce a set of outputs (which may be passed to other systems or components of, for example, a BS 105). For example, a processing system of a BS 105 may refer to a system including the various other components or subcomponents of a BS 105.

The processing system of the BS 105 may interface with other components of the BS 105 and may process information received from other components (such as inputs or signals) and output information to other components. For example, a chip or modem of the BS 105 may include a processing system, a first interface to receive or obtain information, and a second interface to output, transmit, or provide information. In some implementations, the first interface may refer to an interface between the processing system of the chip or modem and a receiver, such that the BS 105 may receive information or signal inputs, and the information may be passed to the processing system. In some implementations, the second interface may refer to an interface between the processing system of the chip or modem and a transmitter, such that the BS 105 may transmit information output from the chip or modem. A person having ordinary skill in the art will readily recognize that the second interface also, or alternatively, may obtain or receive information or signal inputs, and the first interface also, or alternatively, may output, transmit, or provide information.

The inter-station communications manager 945 may manage communications with other BSs 105, and may include a controller or scheduler for controlling communications with UEs 115 in cooperation with other BSs 105. For example, the inter-station communications manager 945 may coordinate scheduling for transmissions to UEs 115 for various interference mitigation techniques such as beamforming or joint transmission. In some examples, the inter-station communications manager 945 may provide an X2 interface within an LTE/LTE-A wireless communications network technology to provide communication between BSs 105.

By including or configuring the communications manager 920 in accordance with examples as described herein, the device 905 may support techniques for reduced latency, more efficient utilization of communication resources, greater coordination between devices, longer battery life, and greater utilization of processing capability.

In some examples, the communications manager 920 may be configured to perform various operations (for example, receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for channel measurement reporting across different DUs of a BS as described herein, or the processor 940 and the memory 930 may be otherwise configured to perform or support such operations.

Figure 10:
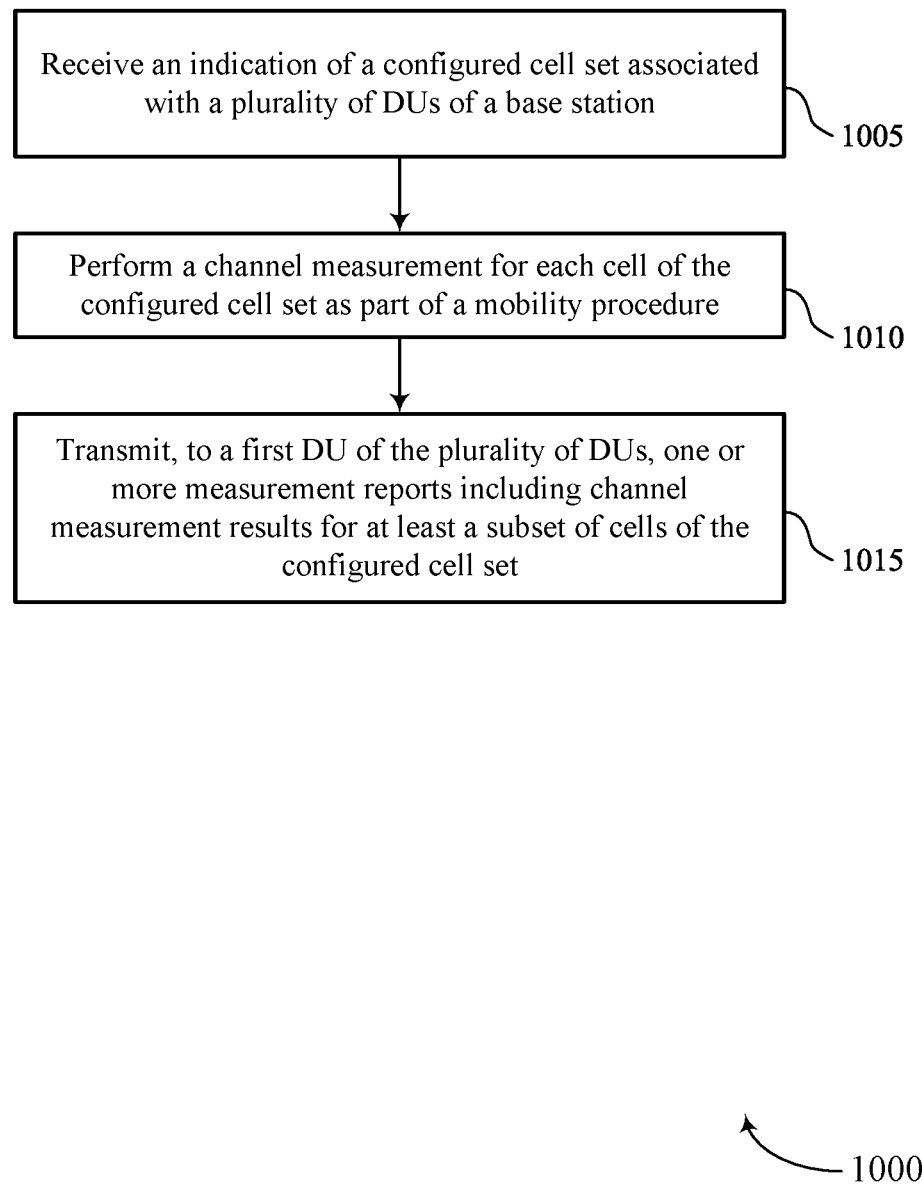
FIGS. 10-13 show flowcharts illustrating methods that support techniques for channel measurement reporting across different DUs of a BS.

FIG. 10 shows a flowchart illustrating a method 1000 that supports techniques for channel measurement reporting across different DUs of a BS. The operations of the method 1000 may be implemented by a UE or its components as described herein. For example, the operations of the method 1000 may be performed by a UE 115 as described with reference to FIGS. 1-8. In some examples, a UE may execute a set of instructions to control the functional elements of the UE to perform the described functions. Additionally, or alternatively, the UE may perform aspects of the described functions using special-purpose hardware.

At 1005, the method may include receiving an indication of a configured cell set associated with a set of multiple DUs of a BS. The operations of 1005 may be performed in accordance with examples as disclosed herein. In some examples, aspects of the operations of 1005 may be performed by a communications manager 820 as described with reference to FIG. 8.

At 1010, the method may include performing a channel measurement for each cell of the configured cell set as part of a mobility procedure. The operations of 1010 may be performed in accordance with examples as disclosed herein. In some examples, aspects of the operations of 1010 may be performed by a communications manager 820 as described with reference to FIG. 8.

At 1015, the method may include transmitting, to a first DU of the set of multiple DUs, one or more measurement reports including channel measurement results for at least a subset of cells of the configured cell set. The operations of 1015 may be performed in accordance with examples as disclosed herein. In some examples, aspects of the operations of 1015 may be performed by a communications manager 820 as described with reference to FIG. 8.

Figure 11:
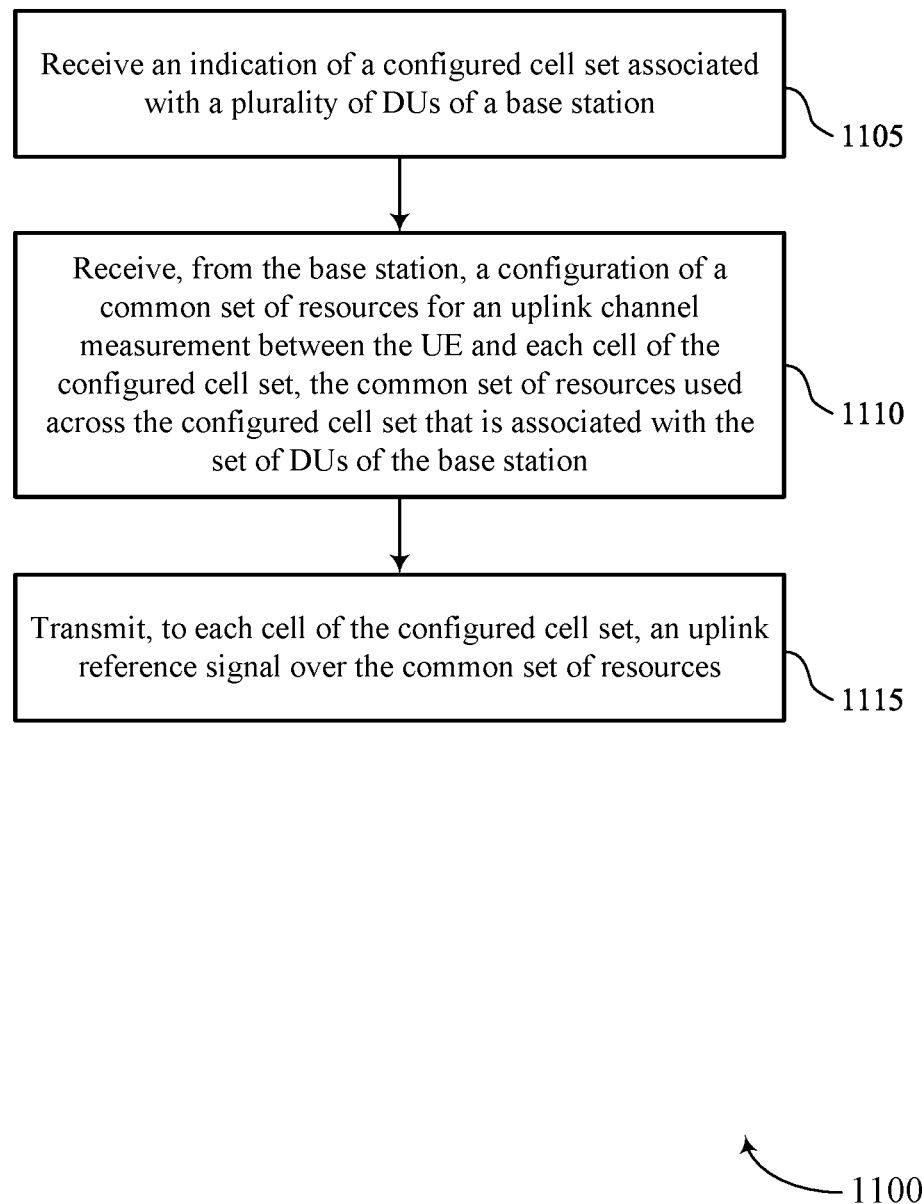

FIG. 11 shows a flowchart illustrating a method 1100 that supports techniques for channel measurement reporting across different DUs of a BS. The operations of the method 1100 may be implemented by a UE or its components as described herein. For example, the operations of the method 1100 may be performed by a UE 115 as described with reference to FIGS. 1-8. In some examples, a UE may execute a set of instructions to control the functional elements of the UE to perform the described functions. Additionally, or alternatively, the UE may perform aspects of the described functions using special-purpose hardware.

At 1105, the method may include receiving an indication of a configured cell set associated with a set of multiple DUs of a BS. The operations of 1105 may be performed in accordance with examples as disclosed herein. In some examples, aspects of the operations of 1105 may be performed by a communications manager 820 as described with reference to FIG. 8.

At 1110, the method may include receiving, from the BS, a configuration of a common set of resources for an uplink channel measurement between the UE and each cell of the configured cell set, the common set of resources used across the configured cell set that is associated with the set of DUs of the BS. The operations of 1110 may be performed in accordance with examples as disclosed herein. In some examples, aspects of the operations of 1110 may be performed by a communications manager 820 as described with reference to FIG. 8.

At 1115, the method may include transmitting, to each cell of the configured cell set, an uplink reference signal over the common set of resources. The operations of 1115 may be performed in accordance with examples as disclosed herein. In some examples, aspects of the operations of 1115 may be performed by a communications manager 820 as described with reference to FIG. 8.

Figure 12:
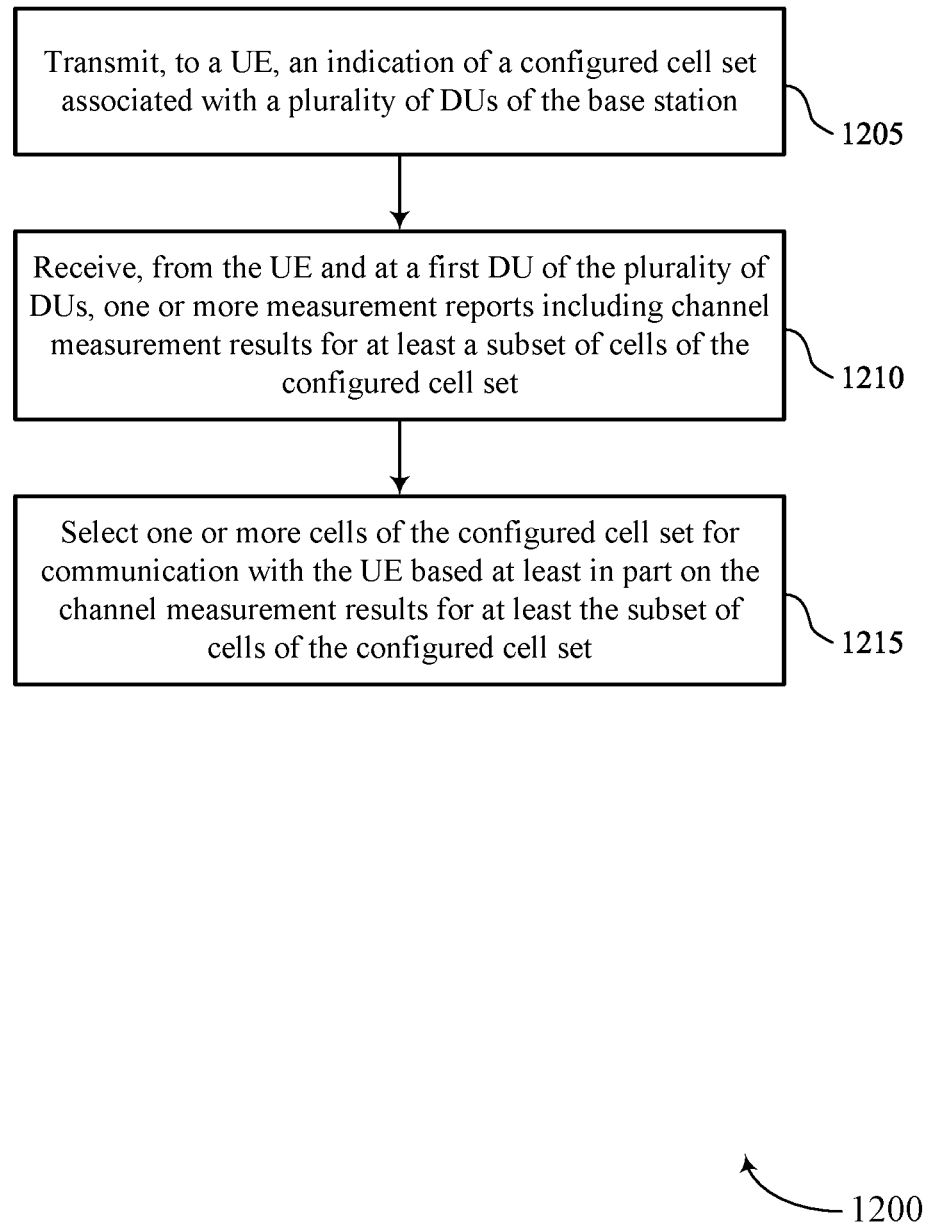

FIG. 12 shows a flowchart illustrating a method 1200 that supports techniques for channel measurement reporting across different DUs of a BS. The operations of the method 1200 may be implemented by a BS or its components as described herein. For example, the operations of the method 1200 may be performed by a BS 105 as described with reference to FIGS. 1-7 and 9. In some examples, a BS may execute a set of instructions to control the functional elements of the BS to perform the described functions. Additionally, or alternatively, the BS may perform aspects of the described functions using special-purpose hardware.

At 1205, the method may include transmitting, to a UE, an indication of a configured cell set associated with a set of multiple DUs of the BS. The operations of 1205 may be performed in accordance with examples as disclosed herein. In some examples, aspects of the operations of 1205 may be performed by a communications manager 920 as described with reference to FIG. 9.

At 1210, the method may include receiving, from the UE and at a first DU of the set of multiple DUs, one or more measurement reports including channel measurement results for at least a subset of cells of the configured cell set. The operations of 1210 may be performed in accordance with examples as disclosed herein. In some examples, aspects of the operations of 1210 may be performed by a communications manager 920 as described with reference to FIG. 9.

At 1215, the method may include selecting one or more cells of the configured cell set for communication with the UE based on the channel measurement results for at least the subset of cells of the configured cell set. The operations of 1215 may be performed in accordance with examples as disclosed herein. In some examples, aspects of the operations of 1215 may be performed by a communications manager 920 as described with reference to FIG. 9.

Figure 13:
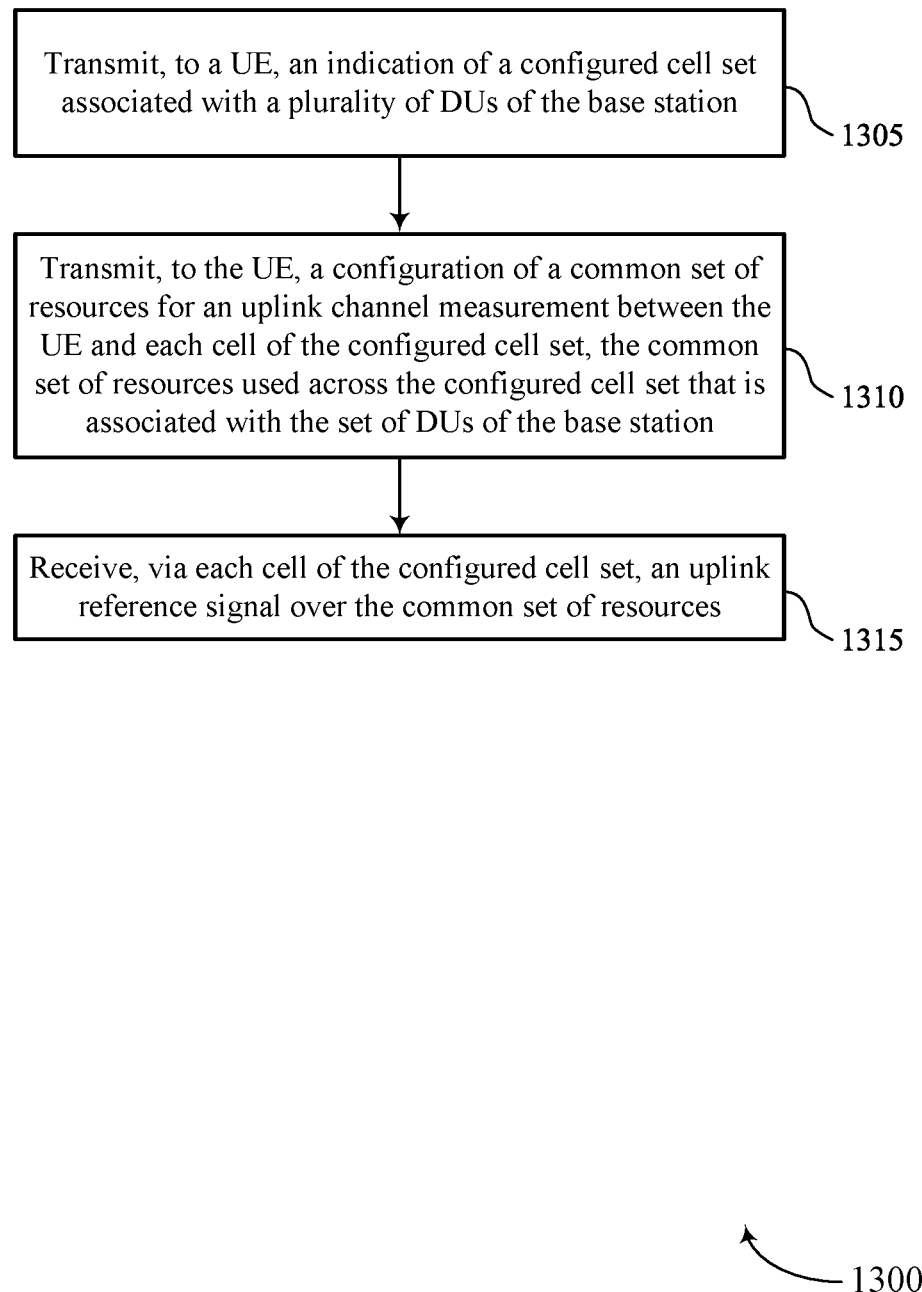

FIG. 13 shows a flowchart illustrating a method 1300 that supports techniques for channel measurement reporting across different DUs of a BS. The operations of the method 1300 may be implemented by a BS or its components as described herein. For example, the operations of the method 1300 may be performed by a BS 105 as described with reference to FIGS. 1-7 and 9. In some examples, a BS may execute a set of instructions to control the functional elements of the BS to perform the described functions. Additionally, or alternatively, the BS may perform aspects of the described functions using special-purpose hardware.

At 1305, the method may include transmitting, to a UE, an indication of a configured cell set associated with a set of multiple DUs of the BS. The operations of 1305 may be performed in accordance with examples as disclosed herein. In some examples, aspects of the operations of 1305 may be performed by a communications manager 920 as described with reference to FIG. 9.

At 1310, the method may include transmitting, to the UE, a configuration of a common set of resources for an uplink channel measurement between the UE and each cell of the configured cell set, the common set of resources used across the configured cell set that is associated with the set of DUs of the BS. The operations of 1310 may be performed in accordance with examples as disclosed herein. In some examples, aspects of the operations of 1310 may be performed by a communications manager 920 as described with reference to FIG. 9.

At 1315, the method may include receiving, via each cell of the configured cell set, an uplink reference signal over the common set of resources. The operations of 1315 may be performed in accordance with examples as disclosed herein. In some examples, aspects of the operations of 1315 may be performed by a communications manager 920 as described with reference to FIG. 9.

The following provides an overview of some aspects of the present disclosure:

Aspect 1: A method for wireless communication at a UE, including: receiving an indication of a configured cell set associated with a plurality of DUs of a BS; performing a channel measurement for each cell of the configured cell set as part of a mobility procedure; and transmitting, to a first DU of the plurality of DUs, one or more measurement reports including channel measurement results for at least a subset of cells of the configured cell set.

Aspect 2: The method of aspect 1, where transmitting the one or more measurement reports includes: transmitting, to the first DU, a first measurement report including channel measurement results for each activated cell associated with a second DU of the plurality of DUs and a second measurement report including channel measurement results for each deactivated cell associated with the second DU.

Aspect 3: The method of aspect 1, where transmitting the one or more measurement reports includes: transmitting, to the first DU, a joint measurement report including channel measurement results for each activated cell associated with a second DU of the plurality of DUs and channel measurement results for each deactivated cell associated with the second DU.

Aspect 4: The method of any of aspects 1 through 3, where transmitting the one or more measurement reports includes: transmitting, to the first DU, a first measurement report including channel measurement results for each activated cell associated with a set of DUs of the plurality of DUs and a second measurement report including channel measurement results for each deactivated cell associated with the set of DUs.

Aspect 5: The method of aspect 4, where the channel measurement results for each activated cell associated with the set of DUs and the channel measurement results for each deactivated cell associated with the set of DUs indicate rankings of the set of DUs with respect to an SSB transmitted from each cell of the set of DUs.

Aspect 6: The method of any of aspects 1 through 5, further including: receiving, from the BS, an activation of a reporting option for the one or more measurement reports.

Aspect 7: The method of aspect 6, where the reporting option may be one of periodic reporting, aperiodic reporting, or semi-persistent reporting.

Aspect 8: The method of any of aspects 1 through 7, further including: receiving, from the BS, a configuration of a set of reporting parameters, where the one or more measurement reports are based at least in part on the configuration of the set of reporting parameters.

Aspect 9: The method of aspect 8, further including: receiving signaling indicating an activation or a deactivation of one or more of the set of reporting parameters.

Aspect 10: The method of aspect 9, where the signaling indicating the activation or the deactivation of the one or more of the set of reporting parameters is received from the first DU or a second DU of the plurality of DUs.

Aspect 11: The method of any of aspects 8 through 10, further including: transmitting, to the BS, signaling indicating an activation or a deactivation of one or more of the set of reporting parameters.

Aspect 12: The method of any of aspects 8 through 11, where the set of reporting parameters includes a cell set for which to report in each of the one or more measurement reports, a quantity of beams to include in the one or more measurement reports, a quantity of cells to include in the one or more measurement reports, a periodicity for the transmitting of the one or more measurement reports, a trigger for the transmitting of the one or more measurement reports, or any combination thereof.

Aspect 13: The method of any of aspects 1 through 12, further including: receiving a downlink reference signal from each cell of the configured cell set; and measuring a signal strength for the downlink reference signal from each cell of the configured cell set over one or more beams, where performing the channel measurement for each cell of the configured cell set is based at least in part on measuring the signal strength for the downlink reference signal from each cell of the configured cell set over the one or more beams.

Aspect 14: The method of any of aspects 1 through 13, where the mobility procedure includes: selecting one or more cells of the configured cell set for communication with the BS based at least in part on the channel measurement for each cell of the configured cell set.

Aspect 15: The method of any of aspects 1 through 14, where the mobility procedure includes: receiving signaling activating or deactivating one or more cells of the configured cell set for communication with the BS in response to the one or more measurement reports.

Aspect 16: A method for wireless communication at a UE, including: receiving an indication of a configured cell set associated with a plurality of DUs of a BS; receiving, from the BS, a configuration of a common set of resources for an uplink channel measurement between the UE and each cell of the configured cell set, where the common set of resources are used across the configured cell set that is associated with the plurality of DUs of the BS; and transmitting, to each cell of the configured cell set, an uplink reference signal over the common set of resources for measurement at each DU of the plurality of DUs.

Aspect 17: The method of aspect 16, where the uplink reference signal includes an SRS.

Aspect 18: A method for wireless communication at a BS, including: transmitting, to a UE, an indication of a configured cell set associated with a plurality of DUs of the BS; receiving, from the UE and at a first DU of the plurality of DUs, one or more measurement reports including channel measurement results for at least a subset of cells of the configured cell set; and selecting one or more cells of the configured cell set for communication with the UE based at least in part on the channel measurement results for at least the subset of cells of the configured cell set.

Aspect 19: The method of aspect 18, where receiving the one or more measurement reports includes: receiving, at the first DU, a first measurement report including channel measurement results for each activated cell associated with a second DU of the plurality of DUs and a second measurement report including channel measurement results for each deactivated cell associated with the second DU.

Aspect 20: The method of aspect 18, where receiving the one or more measurement reports includes: receiving, at the first DU, a joint measurement report including channel measurement results for each activated cell associated with a second DU of the plurality of DUs and channel measurement results for each deactivated cell associated with the second DU.

Aspect 21: The method of any of aspects 18 through 20, where receiving the one or more measurement reports includes: receiving, at the first DU, a first measurement report including channel measurement results for each activated cell associated with a set of DUs of the plurality of DUs and a second measurement report including channel measurement results for each deactivated cell associated with the set of DUs.

Aspect 22: The method of aspect 21, where the channel measurement results for each activated cell associated with the set of DUs and the channel measurement results for each deactivated cell associated with the set of DUs indicate rankings of the set of DUs with respect to an SSB transmitted from each cell of the set of DUs.

Aspect 23: The method of any of aspects 18 through 22, further including: transmitting, to the UE, an activation of a reporting option for the one or more measurement reports.

Aspect 24: The method of any of aspects 18 through 23, further including: transmitting, to the UE, a configuration of a set of reporting parameters, where the one or more measurement reports are based at least in part on the configuration of the set of reporting parameters.

Aspect 25: The method of aspect 24, further including: transmitting, to the UE, signaling indicating an activation or a deactivation of one or more of the set of reporting parameters.

Aspect 26: The method of aspect 24, further including: receiving, from the UE, signaling indicating an activation or a deactivation of one or more of the set of reporting parameters.

Aspect 27: The method of any of aspects 18 through 26, further including: transmitting, from the first DU to each of a remainder of the plurality of DUs of the BS, the one or more measurement reports including the channel measurement results for at least the subset of cells of the configured cell set.

Aspect 28: A method for wireless communication at a BS, including: transmitting, to a UE, an indication of a configured cell set associated with a plurality of DUs of the BS; transmitting, to the UE, a configuration of a common set of resources for an uplink channel measurement between the UE and each cell of the configured cell set, where the common set of resources are used across the configured cell set that is associated with the plurality of DUs of the BS; and receiving, via each cell of the configured cell set, an uplink reference signal over the common set of resources.

Aspect 29: The method of aspect 28, further including: performing the uplink channel measurement for each cell of the configured cell set at each DU of the plurality of DUs based at least in part on the uplink reference signal; and selecting one or more cells of the configured cell set for communication with the UE based at least in part on the uplink channel measurement for each cell of the configured cell set.

Aspect 30: The method of any of aspects 28 through 29, where the uplink reference signal includes an SRS.

Aspect 31: An apparatus for wireless communication at a UE, including a first interface, a second interface, and a processing system configured to cause the apparatus to perform a method of any of aspects 1 through 15.

Aspect 32: An apparatus for wireless communication at a UE, including a processor; memory coupled with the processor; and instructions stored in the memory and executable by the processor to cause the apparatus to perform a method of any of aspects 1 through 15.

Aspect 33: An apparatus for wireless communication at a UE, including at least one means for performing a method of any of aspects 1 through 15.

Aspect 34: A non-transitory computer-readable medium storing code for wireless communication at a UE, the code including instructions executable by a processor to perform a method of any of aspects 1 through 15.

Aspect 35: An apparatus for wireless communication at a UE, including a first interface, a second interface, and a processing system configured to cause the apparatus to perform a method of any of aspects 16 through 17.

Aspect 36: An apparatus for wireless communication at a UE, including a processor; memory coupled with the processor; and instructions stored in the memory and executable by the processor to cause the apparatus to perform a method of any of aspects 16 through 17.

Aspect 37: An apparatus for wireless communication at a UE, including at least one means for performing a method of any of aspects 16 through 17.

Aspect 38: A non-transitory computer-readable medium storing code for wireless communication at a UE, the code including instructions executable by a processor to perform a method of any of aspects 16 through 17.

Aspect 39: An apparatus for wireless communication at a BS, including a first interface, a second interface, and a processing system configured to cause the apparatus to perform a method of any of aspects 18 through 27.

Aspect 40: An apparatus for wireless communication at a BS, including a processor; memory coupled with the processor; and instructions stored in the memory and executable by the processor to cause the apparatus to perform a method of any of aspects 18 through 27.

Aspect 41: An apparatus for wireless communication at a BS, including at least one means for performing a method of any of aspects 18 through 27.

Aspect 42: A non-transitory computer-readable medium storing code for wireless communication at a BS, the code including instructions executable by a processor to perform a method of any of aspects 18 through 27.

Aspect 43: An apparatus for wireless communication at a BS, including a first interface, a second interface, and a processing system configured to cause the apparatus to perform a method of any of aspects 28 through 30.

Aspect 44: An apparatus for wireless communication at a BS, including a processor; memory coupled with the processor; and instructions stored in the memory and executable by the processor to cause the apparatus to perform a method of any of aspects 28 through 30.

Aspect 45: An apparatus for wireless communication at a BS, including at least one means for performing a method of any of aspects 28 through 30.

Aspect 46: A non-transitory computer-readable medium storing code for wireless communication at a BS, the code including instructions executable by a processor to perform a method of any of aspects 28 through 30.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc. Disks usually reproduce data magnetically, while discs reproduce data optically with lasers. Combinations of the above also may be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in some combinations and even initially claimed as such, one or more features from a claimed combination can be excised from the combination, and the claimed combination may be directed to a subcombination or variation of a subcombination.

Similarly, while operations are depicted in the drawings in a particular order, this may not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above may not be understood as requiring such separation in all implementations, and it may be understood that the described program components and systems can generally be integrated together in a single software product or packaged into multiple software products. Additionally, other implementations are within the scope of the following claims. In some examples, the actions recited in the claims can be performed in a different order and still achieve desirable results.

What is claimed is:

1. An apparatus for wireless communication at a user equipment (UE), comprising:
    a first interface configured to:
        obtain an indication of a configured cell set associated with a plurality of distributed units (DUs) of a network device;
    a processing system configured to:
        perform a channel measurement for each cell of the configured cell set as part of a mobility procedure; and
    the first interface or a second interface configured to:
        output, to a first DU of the plurality of DUs, one or more measurement reports including channel measurement results for at least a subset of cells of the configured cell set, the channel measurement results including channel measurement results for each activated cell associated with a second DU and channel measurement results for each deactivated cell associated with the second DU, wherein outputting the one or more measurement reports further comprises outputting, for transmission to the first DU, a joint measurement report including the channel measurement results for each activated cell associated with the second DU of the plurality of DUs and the channel measurement results for each deactivated cell associated with the second DU.

2. The apparatus of claim 1, wherein outputting the one or more measurement reports further comprises:
outputting, for transmission to the first DU, a first measurement report including the channel measurement results for each activated cell associated with the second DU of the plurality of DUs and a second measurement report including the channel measurement results for each deactivated cell associated with the second DU.

3. The apparatus of claim 1, wherein outputting the one or more measurement reports further comprises:
outputting, for transmission to the first DU, a first measurement report including channel measurement results for each activated cell associated with a set of DUs of the plurality of DUs and a second measurement report including channel measurement results for each deactivated cell associated with the set of DUs.

4. The apparatus of claim 3, wherein the channel measurement results for each activated cell associated with the set of DUs and the channel measurement results for each deactivated cell associated with the set of DUs indicate rankings of the set of DUs with respect to a synchronization signal block (SSB) transmitted from each cell of the set of DUs.

5. The apparatus of claim 1, wherein the first interface or the second interface is further configured to:
obtain, from the network device, an activation of a reporting option for the one or more measurement reports.

6. The apparatus of claim 5, wherein the reporting option may be one of periodic reporting, aperiodic reporting, or semi-persistent reporting.

7. The apparatus of claim 1, wherein the first interface or the second interface is further configured to:
obtain, from the network device, a configuration of a set of reporting parameters, the one or more measurement reports being associated with the configuration of the set of reporting parameters.

8. The apparatus of claim 7, wherein the first interface or the second interface is further configured to:
obtain signaling indicating an activation or a deactivation of one or more of the set of reporting parameters.

9. The apparatus of claim 8, wherein the signaling indicating the activation or the deactivation of the one or more of the set of reporting parameters is received from the first DU or the second DU of the plurality of DUs.

10. The apparatus of claim 7, wherein the first interface or the second interface is further configured to:
output, for transmission to the network device, signaling indicating an activation or a deactivation of one or more of the set of reporting parameters.

11. The apparatus of claim 7, wherein the set of reporting parameters comprises a cell set for which to report in each of the one or more measurement reports, a quantity of beams to include in the one or more measurement reports, a quantity of cells to include in the one or more measurement reports, a periodicity for outputting the one or more measurement reports, a trigger for outputting the one or more measurement reports, or any combination thereof.

12. The apparatus of claim 1, wherein:
the first interface or the second interface is further configured to:
obtain a downlink reference signal from each cell of the configured cell set; and
the processing system is further configured to:
measure a signal strength for the downlink reference signal from each cell of the configured cell set over one or more beams, performing the channel measurement for each cell of the configured cell set being associated with measuring the signal strength for the downlink reference signal from each cell of the configured cell set over the one or more beams.

13. The apparatus of claim 1, wherein the processing system is further configured to:
select one or more cells of the configured cell set for communication with the network device in accordance with the channel measurement for each cell of the configured cell set.

14. The apparatus of claim 1, wherein the first interface or the second interface is further configured to:
obtain signaling activating or deactivating one or more cells of the configured cell set for communication with the network device in response to the one or more measurement reports.

15. The apparatus of claim 1, wherein the joint measurement report includes channel measurement results for each activated cell associated with a plurality of DUs and channel measurement results for each deactivated cell associated with the plurality of DUs.

16. An apparatus for wireless communication at a network device, comprising:
a first interface configured to:
output, for transmission to a user equipment (UE), an indication of a configured cell set associated with a plurality of distributed units (DUs) of the network device;
the first interface or a second interface configured to:
obtain, from the UE and at a first DU of the plurality of DUs, one or more measurement reports including channel measurement results for at least a subset of cells of the configured cell set, the channel measurement results including channel measurement results for each activated cell associated with a second DU and channel measurement results for each deactivated cell associated with the second DU, wherein obtaining the one or more measurement reports further comprises obtaining, at the first DU, a joint measurement report including the channel measurement results for each activated cell associated with the second DU of the plurality of DUs and the channel measurement results for each deactivated cell associated with the second DU; and
a processing system configured to:
select one or more cells of the configured cell set for communication with the UE in accordance with the channel measurement results for at least the subset of cells of the configured cell set.

17. The apparatus of claim 16, wherein obtaining the one or more measurement reports further comprises:
obtaining, at the first DU, a first measurement report including the channel measurement results for each activated cell associated with the second DU of the plurality of DUs and a second measurement report including the channel measurement results for each deactivated cell associated with the second DU.

18. The apparatus of claim 16, wherein obtaining the one or more measurement reports further comprises:

obtaining, at the first DU, a first measurement report including channel measurement results for each activated cell associated with a set of DUs of the plurality of DUs and a second measurement report including channel measurement results for each deactivated cell associated with the set of DUs.

19. The apparatus of claim 18, wherein the channel measurement results for each activated cell associated with the set of DUs and the channel measurement results for each deactivated cell associated with the set of DUs indicate rankings of the set of DUs with respect to a synchronization signal block (SSB) transmitted from each cell of the set of DUs.

20. The apparatus of claim 16, wherein the first interface or the second interface is further configured to:
output, for transmission to the UE, an activation of a reporting option for the one or more measurement reports.

21. The apparatus of claim 16, wherein the first interface or the second interface is further configured to:
output, for transmission to the UE, a configuration of a set of reporting parameters, the one or more measurement reports being associated with the configuration of the set of reporting parameters.

22. The apparatus of claim 21, wherein the first interface or the second interface is further configured to:
output, for transmission to the UE, signaling indicating an activation or a deactivation of one or more of the set of reporting parameters.

23. The apparatus of claim 21, wherein the first interface or the second interface is further configured to:
obtain, from the UE, signaling indicating an activation or a deactivation of one or more of the set of reporting parameters.

24. The apparatus of claim 18, wherein the first interface or the second interface is further configured to:
output, from the first DU to each of a remainder of the plurality of DUs of the network device, the one or more measurement reports including the channel measurement results for at least the subset of cells of the configured cell set.

25. The apparatus of claim 16, wherein the joint measurement report includes channel measurement results for each activated cell associated with a plurality of DUs and channel measurement results for each deactivated cell associated with the plurality of DUs.

26. A method for wireless communication at a user equipment (UE), comprising:
receiving an indication of a configured cell set associated with a plurality of distributed units (DUs) of a network device;
performing a channel measurement for each cell of the configured cell set as part of a mobility procedure; and
transmitting, to a first DU of the plurality of DUs, one or more measurement reports including channel measurement results for at least a subset of cells of the configured cell set, the channel measurement results including channel measurement results for each activated cell associated with a second DU and channel measurement results for each deactivated cell associated with the second DU, wherein transmitting the one or more measurement reports comprises transmitting, to the first DU, a joint measurement report including the channel measurement results for each activated cell associated with the second DU of the plurality of DUs and the channel measurement results for each deactivated cell associated with the second DU.

27. The method of claim 26, wherein transmitting the one or more measurement reports comprises:
transmitting, to the first DU, a first measurement report including the channel measurement results for each activated cell associated with the second DU of the plurality of DUs and a second measurement report including the channel measurement results for each deactivated cell associated with the second DU.

28. The method of claim 26, wherein transmitting the one or more measurement reports comprises:
transmitting, to the first DU, a first measurement report including channel measurement results for each activated cell associated with a set of DUs of the plurality of DUs and a second measurement report including channel measurement results for each deactivated cell associated with the set of DUs.

29. The method of claim 26, wherein the joint measurement report includes channel measurement results for each activated cell associated with a plurality of DUs and channel measurement results for each deactivated cell associated with the plurality of DUs.

30. A method for wireless communication at a network device, comprising:
transmitting, to a user equipment (UE), an indication of a configured cell set associated with a plurality of distributed units (DUs) of the network device;
receiving, from the UE and at a first DU of the plurality of DUs, one or more measurement reports including channel measurement results for at least a subset of cells of the configured cell set, the channel measurement results including channel measurement results for each activated cell associated with a second DU and channel measurement results for each deactivated cell associated with the second DU, wherein receiving the one or more measurement reports further comprises receiving, at the first DU, a joint measurement report including the channel measurement results for each activated cell associated with the second DU of the plurality of DUs and the channel measurement results for each deactivated cell associated with the second DU; and
selecting one or more cells of the configured cell set for communication with the UE in accordance with the channel measurement results for at least the subset of cells of the configured cell set.

* * * * *